(12) United States Patent
Chappell

(10) Patent No.: US 11,144,997 B2
(45) Date of Patent: Oct. 12, 2021

(54) SYSTEM AND METHOD FOR EXPEDITING PURCHASE OF VEHICULAR INSURANCE

(71) Applicant: James Mark Chappell, Alexander City, AL (US)

(72) Inventor: James Mark Chappell, Alexander City, AL (US)

(*) Notice: Subject to any disclaimer, the term of this patent is extended or adjusted under 35 U.S.C. 154(b) by 306 days.

(21) Appl. No.: 15/828,313

(22) Filed: Nov. 30, 2017

(65) Prior Publication Data

US 2018/0315127 A1 Nov. 1, 2018

Related U.S. Application Data

(66) Substitute for application No. PCT/US2017/029976, filed on Apr. 27, 2017, now abandoned.

(60) Provisional application No. 62/585,934, filed on Nov. 14, 2017.

(51) Int. Cl.
| | |
|---|---|
| *G06Q 40/08* | (2012.01) |
| *G06K 9/00* | (2006.01) |
| *G06F 3/16* | (2006.01) |
| *G06Q 20/32* | (2012.01) |
| *G06Q 20/04* | (2012.01) |

(52) U.S. Cl.
CPC ............ *G06Q 40/08* (2013.01); *G06F 3/167* (2013.01); *G06K 9/00469* (2013.01); *G06Q 20/047* (2020.05); *G06Q 20/3223* (2013.01)

(58) Field of Classification Search
CPC .. G06Q 40/08; G06Q 20/047; G06Q 20/3223; G06K 9/00469; G06F 3/167
See application file for complete search history.

(56) References Cited

U.S. PATENT DOCUMENTS

| 10,032,042 B1* | 7/2018 | Eckel | ........................ G06F 21/34 |
| 2013/0204645 A1* | 8/2013 | Lehman | ............... G06Q 20/322 |
| | | | 705/4 |
| 2013/0211916 A1* | 8/2013 | Putman | .................. G06Q 30/02 |
| | | | 705/14.58 |

(Continued)

OTHER PUBLICATIONS

Whei-Jen Chen et al. "Implementing Document Imaging and Capture Solutions with IBM Datacap" ibm.com/redbooks. Oct. 2, 2015 (Year: 2015).*

*Primary Examiner* — Elda G Milef
(74) *Attorney, Agent, or Firm* — Knobbe Martens Olson & Bear LLP

(57) ABSTRACT

A mobile application for purchasing vehicular insurance without the need for manual data entry via a mobile device keyboard is disclosed. The mobile application is configured to image driver's licenses and vehicle barcodes to collect relevant driver and vehicular information. Other relevant data is either collected from correlated third-party databases or user input via voice recognition or user-friendly graphical user interface screens. Collected information is transmitted to one or more insurers and one or more quotes are displayed for consideration by the applicant. The mobile application may further comprise payment services and insurance agency point of sale services. The mobile application further provides an interactive digital insurance identification card to serve as a platform and dashboard for readily accessing services associated with the insurance policy, particularly when in an accident, when roadside services are required, and when a lower cost updated policy is available to the insured party.

15 Claims, 28 Drawing Sheets

(56) References Cited

U.S. PATENT DOCUMENTS

| | | | |
|---|---|---|---|
| 2013/0290036 A1* | 10/2013 | Strange | G06Q 20/3276 |
| | | | 705/4 |
| 2015/0187015 A1* | 7/2015 | Adams | G06Q 40/08 |
| | | | 705/4 |
| 2015/0187019 A1* | 7/2015 | Fernandes | G06Q 40/08 |
| | | | 705/4 |
| 2016/0182707 A1* | 6/2016 | Gabel | H04M 1/72424 |
| | | | 455/404.2 |

* cited by examiner

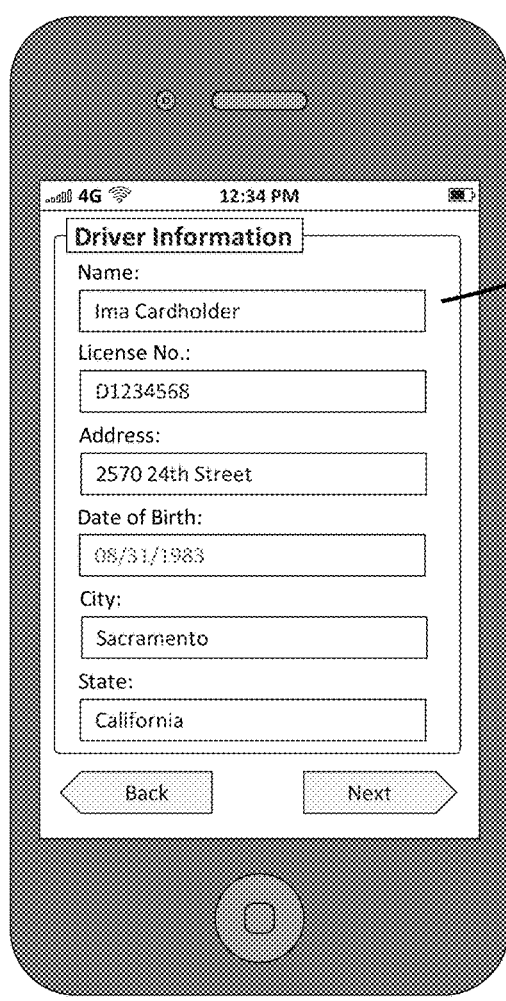
Fig. 6I
Fig. 6J

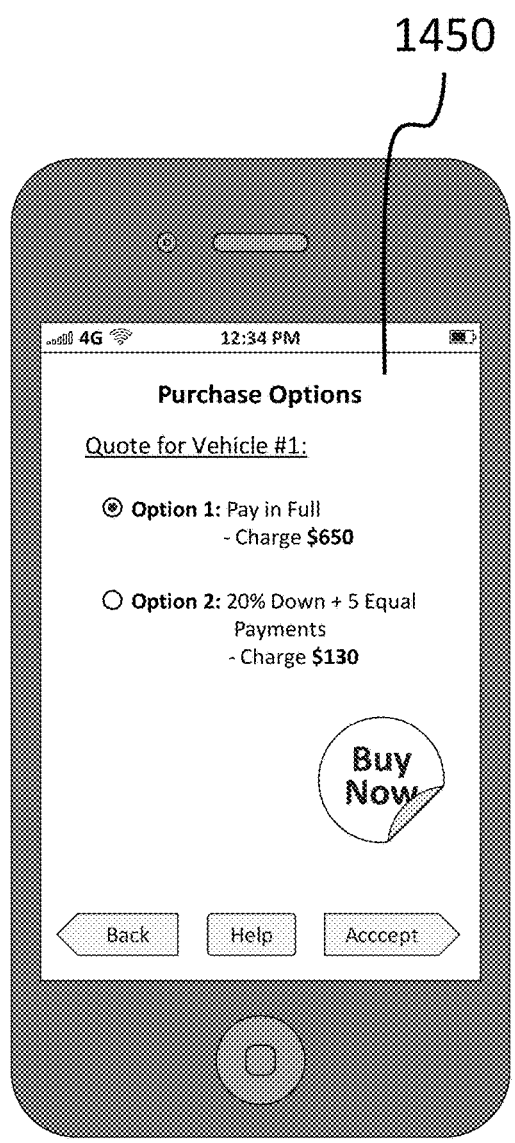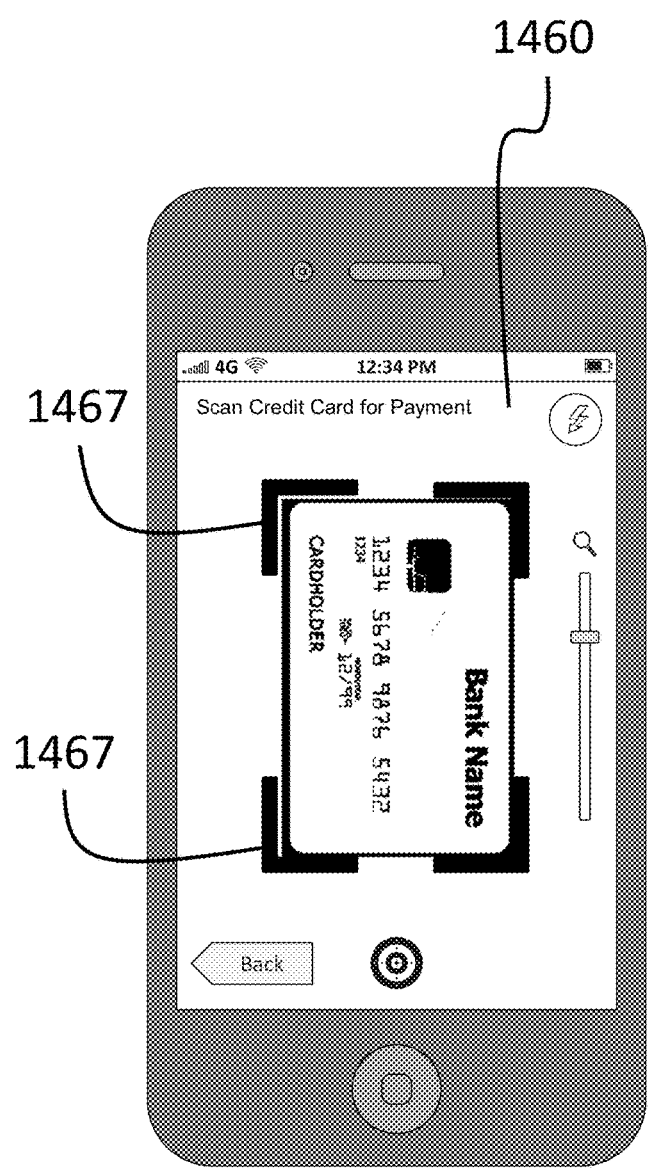
Fig. 6U
Fig. 6V

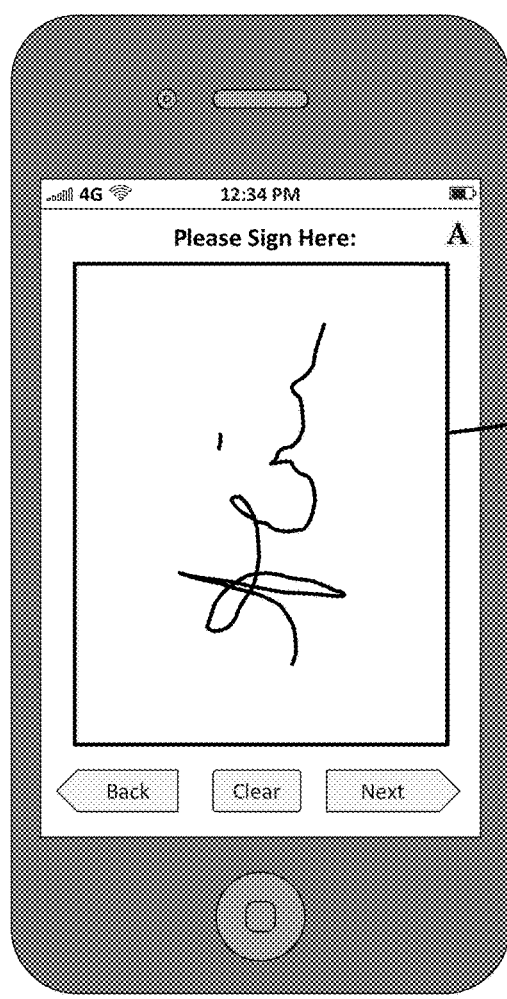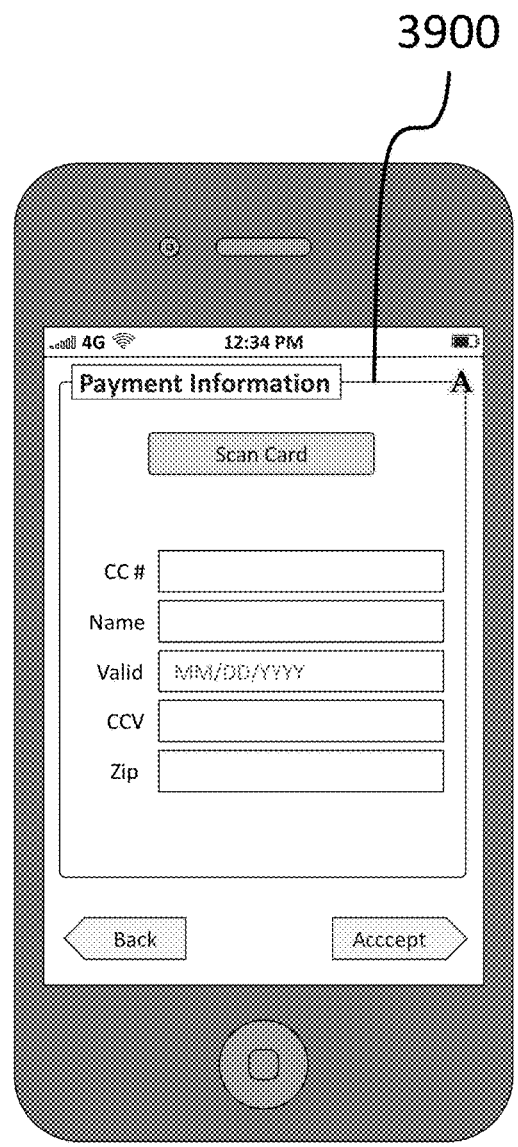
Fig. 8K
Fig. 8L

SYSTEM AND METHOD FOR EXPEDITING PURCHASE OF VEHICULAR INSURANCE

CROSS REFERENCE TO RELATED APPLICATIONS

None.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

FIELD OF THE INVENTION

The invention relates to systems and methods for purchasing insurance for vehicles. More particularly, the invention relates to a consumer-centric insurance point of sale application for mobile devices used to remotely underwrite and purchase vehicle insurance.

BACKGROUND

There exists a significant unmet need for streamlining the process of applying for and processing vehicle insurance policy applications. Insurance providers require certain information to insure against risk in return for a premium. Typically, the information necessary for an insurance quote (i.e. client age, marital, status, make, coverage options and vehicle year, and model) is input manually into a database using a computer keyboard or a touch screen keypad on mobile devices. The potential customer may then be instructed to gather and/or provide additional information.

Most consumers find it difficult and time consuming to collect all information needed when applying for a new vehicle insurance policy, and may fail to complete the application process because one or more pieces of information are missing or difficult to obtain. Further, the collection and processing of this information can be time consuming and complex, involving many manual steps and duplicative actions on the part of the potential customer and the insurance provider. Further, such information is typically input manually into a database using a computer keyboard or a touch screen keypad on mobile devices, either by the potential customer searching for insurance, or by the insurance provider, if contacted by the potential customer.

Furthermore, even when the consumer has completed an application, the information must be verified by the insurance company receiving the application. Verification requires the comparison of information collected from the consumer to information about the consumer that the insurance company is able to obtain from other third party databases. These other databases include, but need not be limited to, driver license databases, state accident and vehicle ownership databases, federal databases, criminal record databases, judicial databases, credit record databases and other public, commercial and private databases. Without seamless integration and access, significant additional time is required to process the insurance application, during which the consumer may lose interest in obtaining the policy.

Still further, when a consumer receives a valid quote for a vehicle insurance policy from an individual insurance company, there is no way to determine whether that coverage and cost presented in the quote is the best as compared to what might be available from other companies. Consequently, due to the inconvenience associated with submitting applications to other insurance companies, a consumer is likely to accept the first quote, although it might not be the best.

Completing forms on a mobile device using the keyboard of the mobile device is difficult. Completing data fields using a keyboard typically results in a high rate of human error in data acquisition and entry. Consequently, it is clear that there exists a substantial unmet need for a simple, user-friendly mobile insurance point of sale system that will allow a user to submit all data without typing using the keyboard of the mobile device. There is a further need for such a system that will provide an expedited approach to verify that the data collected using the mobile device can be confirmed as authentic and accurate. Still further, to expedite the selection and purchase of vehicle insurance, it would be desirable to have a consumer-centric system that is sufficiently competent and comprehensive to eliminate the need for the participation of a middle man, i.e., an insurance agent, other than for a final review of submitted data to support underwriting and issuance of a the final binding insurance policy. Further, there is a need for such a system capable of taking all data input without requiring use of a keyboard.

There exist various disclosures that present features to support online application for vehicle insurance. For example, U.S. Pat. App. No. 2013/0204645, Mobile Insurance Platform System, from Matthew Daniel Lehman et al, and assigned to Progressive Casualty Insurance Company, discloses a mobile insurance platform system that broadly addresses a plurality of different means for collecting data using a mobile device for the purposing of submitting insurance claims and for obtaining quotes for insurance coverage. Despite the breadth of the description of the invention of Lehman, the described system fails to provide a solution that is capable of expediting the insurance coverage process, eliminating errors and eliminating the need for participation by a middle man, e.g., the insurance agent. In addition, the disclosure of Lehman does not address methods for ensuring accuracy of data submitted and avoidance of the use of a keyboard on the mobile device. Further, the disclosure of Lehman does not disclose a virtual interactive insurance identification card. Further, the disclosure of Lehman describes an extensive insurance application network architecture designed to support multiple insurance functions beyond acquiring vehicular insurance.

U.S. Pat. No. 8,401,878 B2, "Method and System for Connecting an Insured to an Insurer Using a Mobile Device" to Stender et al discloses a mobile interface between parties to an insurance transaction. As with the disclosure by Lehman et al described above, the disclosure by Stender includes features beyond that of merely purchasing an insurance policy, to include submittal of claims and to support types of insurances beyond automobile insurance. The disclosure of Stender et al likewise does not address the provision of a virtual interactive insurance identification card.

U.S. Pat. No. 8,340,83 B2, "Method and System for Furnishing an On-line Quote for an Insurance Product," to Grover et al and assigned to The Travelers Indemnity Company, discloses an on-line insurance quoting system that requires a user to input data into a web application via a keyboard. The disclosure of Grover et al does not describe the use of a mobile device for inputting and communicating data to an insurer. All data entry by a user of the system is manual.

U.S. Pat. No. 8,255,243 B2, "System and Method for Insurance Underwriting and Rating," to Raines et al and assigned to Carfax, Inc., discloses a system, apparatus and method focused on gathering data associated with a motor vehicle, primarily based on the Vehicle Identification Number (VIN). The disclosure of Raines is directed to vehicle information and does not describe features or functionality to support the use of a mobile device by a consumer to apply for and bind automobile insurance.

There exist a number of insurance apps that can be obtained for use on an (PAD, (PHONE, ANDROID or other mobile device. For example, GEICO provides GEICO Mobile, a mobile app available on the iPAD and iPHONE. GEICO Mobile is an all-inclusive app to support access to static insurance ID Cards, billing, policy, claims, glass damage, roadside assistance, accident assistance and other consumer-centric insurance interests. The GEICO Mobile app is not dedicated to automated collection of information to support expediting application for and binding of an insurance policy, along with ensuring accuracy of collected and input data.

Other insurance companies, including STATE FARM, THE GENERAL, PROGRESSIVE, ALLSTATE, ESURANCE, NATIONWIDE, FARMERS INSURANCE, 21ST CENTURY INSURANCE and others provide similar mobile apps for use on an iPHONE and iPAD. None of the above emphasize accuracy of data input nor do they contemplate inclusion of a virtual interactive insurance identification card.

Other software applications, in this case, mobile software apps, exist that purport to provide a means for comparing quotes from multiple insurance carriers. However, our research indicates that these apps merely take you to the site of a desired insurance carrier and fail to aggregate data from multiple quotes for comparison.

Hence, a need exists for an insurance point of sale system and method that enables faster and more efficient interactions than currently available. In addition, a need exists for a mobile insurance point of sale system that utilizes scanning and other technology resident in a user's mobile device to eliminate typing or manual entry of insurance data necessary to obtain an insurance rating, a price for the proposed policy and finally a binding agreement for insurance coverage. Still further, there exists a substantial unmet need for such a system capable of providing timely and periodic assessment of improved insurance policies based on either coverage or price. Further, a need exists for such a system and method that can provide multiple insurance quotes to a user from multiple providers based on automated data input with minimal manual entry by the user. Still further, a need exists for such a system and method that will allow a user to directly and conveniently purchase insurance from a mobile device. Finally, a need exists for a virtual interactive insurance identification card that simplifies interaction by the insured user after obtaining coverage.

SUMMARY

The present invention is a system and method for expediting vehicle insurance purchases using a mobile device while reducing input errors. The method and system is further applicable to purchasing other types of insurance. A potential customer, insurance applicant, or agent, hereinafter, a "user," is able to rate and purchase insurance with a mobile computing device, such as a smart phone. A user wishing to purchase vehicular insurance, according to the system and method of the present invention, is able to avoid visiting the office of an insurance agent. Likewise, the present invention avoids the need for an insurance agent to visit the user. Further, a user need not have a laptop or desktop computer t to purchase vehicular insurance. Every aspect of the insurance transaction may be completed via the user's mobile device, such as a smartphone or tablet. Additionally, even where the mobile device does not have cellular connectivity, Wi-Fi wireless connectivity may be used.

The present invention provides a more efficient, convenient, and less error-prone alternative to current methods of: a) obtaining insurance quotes, b) comparing multiple quotes, c) purchasing insurance, d) obtaining updated insurance quotes, and e) accessing various services associated with insurance coverage via a digital insurance ID and dashboard. The present invention expedites the insurance application and binding process. In addition, the invention avoids the entry of incorrect information which decelerates the application and binding process via the integration of several features and functions used to qualify and confirm the accuracy and legitimacy of all information gathered from an applicant for insurance. The present invention relies on input methods that eschew the use of a textual or QWERTY keyboard, thereby eliminating the inevitable input of incorrect information caused by the use of a small keyboard on a mobile device.

According to an embodiment of the invention, a user collects necessary information using a mobile device configured to execute and run a purpose-built point-of-sale software application for that purpose, hereinafter the "POS application." A user is typically an insurance applicant, but in other embodiments, the invention supports use by an insurance agent. The POS application likewise is configured to transmit collected information to other components of the system that process the data either locally or remotely. For example, a user will scan a driver's license using the POS application on a mobile device, e.g., a smart phone and extract relevant driver information that can then be used to obtain additional driver information from other remote sources.

Likewise, a user will scan a vehicle barcode and vehicle identification number, i.e., the VIN, using the POS application with the mobile device. The POS application then causes certain collected information to be transmitted to a central processing center of one or more potential insurers or a cloud-based server structure that runs and maintains the quote engine for one or more insurance providers. A centralized server processes and verifies the submitted information where a quote engine applies various pricing and coverage algorithms, and finally, one or more quotes are then transmitted for display to the user applicant. If the applicant confirms and approves one of the quotes, the system communicates with the selected insurance provider and causes the insurance provider to create an insurance policy and forward the ultimate policy to the applicant along with a request for signature and payment via credit card or other electronic method. The POS application processes payment and once payment has been received and confirmed by the insurer, a digital virtual interactive insurance verification card is issued to the applicant via the POS application. The digital virtual interactive insurance verification card serves as a convenient and effective dashboard through which the insured user is subsequently able to access all information and services associated with their insurance policy and coverage without having to use the original POS application.

BRIEF DESCRIPTION OF THE SEVERAL VIEWS OF THE DRAWINGS

These and other features, aspects and advantages of various embodiments of the present invention will become better understood with regard to the following description, appended claims, and accompanying drawings where:

Figure 1:
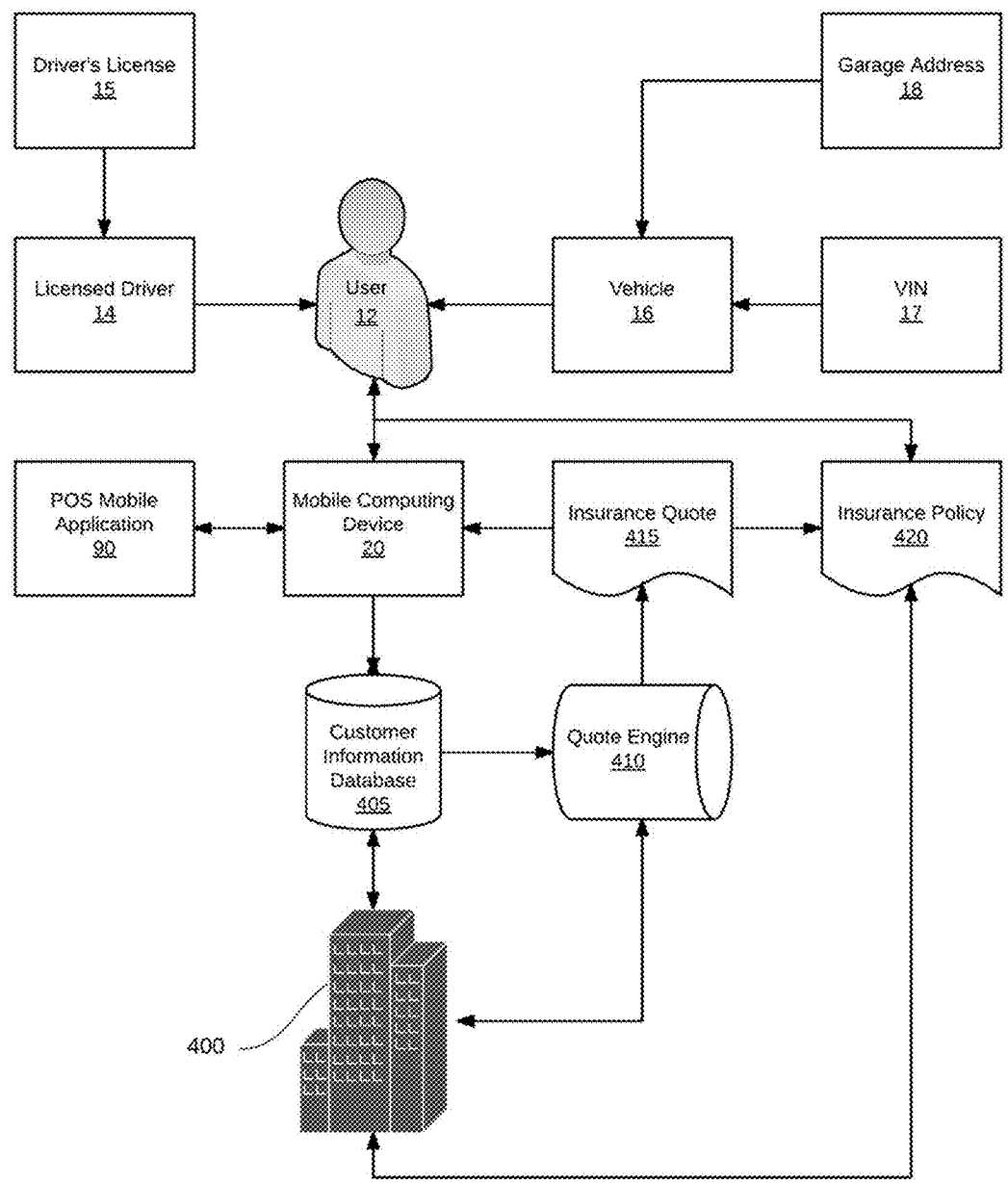
FIG. 1 is a diagram of the system relating the primary parties and components associated with creation of an insurance policy, according to the present invention.

The accompanying drawings numbered herein are given by way of illustration only and are not intended to be limitative to any extent. Commonly used reference numbers identify the same or equivalent parts of the claimed invention throughout the several Figures.

DETAILED DESCRIPTION

FIG. 1 through FIG. 9, wherein like parts are designated by like reference numerals throughout, illustrate example embodiments of a method and system for efficiently purchasing vehicle insurance via a mobile device according to the present invention with minimal data input errors. Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements, graphic designs, organization or network connectivity, for example, in a manner still in keeping with the spirit and scope of the present invention.

Referring to FIG. 1, an embodiment of the system 10 as taught by the invention is shown. A user 12 is an individual who may seek to obtain an insurance quote 415 and eventual insurance policy 420 from an insurance company 400. Typically, the user 12 is an actual consumer, but, in certain embodiments, the user 12 may also be an agent obtaining and entering data on behalf of an applicant. The insurance quote 415 is an offering of an insurance policy 420 covering one or more licensed drivers 14 and vehicles 16. A licensed driver 14 is an individual with a valid driver's license 15 who will be covered by the insurance quote 415, and may include the user 12 and other drivers 14 within the user 12 household or company. A vehicle 16 is uniquely represented by a vehicle identification number 17 (also referred to as a "VIN"). A vehicle 16 may be further identified by a garage address 18 that is used to determine insurance rates for a specific geographic area. The user 12 obtains an insurance quote 415 by interacting with his or her mobile device 20 configured to execute and run an insurance sales software application 90, hereinafter, the mobile pont of sale or POS application 90.

The mobile computing device 20 may comprise a mobile telephone handset, a Personal Digital Assistant, or other mobile communication device. Further, the mobile device 20 may comprise any type of portable or mobile electronics device, such as for example a smartphone, a cell phone, a mobile telephone, personal digital assistant (PDA), laptop computer, tablet-style computer, or any other portable electronic device. For example, in some embodiments, the mobile device 20 may be a smart phone, such as an IPHONE by APPLE, a BLACKBERRY phone by RIM, a PALM phone, or a phone using an ANDROID, MICROSOFT, or SYMBIAN operating system (OS), for example. In some embodiments, the mobile device 20 may be a tablet, such as an IPAD by APPLE, a GALAXY by SAMSUNG, and LATITUDE ST TABLET PC by DELL, for example.

The mobile device 20 includes a camera 37 or other imaging device, such as a scanner. Images of the documents taken using the mobile device 20 or downloaded to the mobile device 20 can be transmitted to a system remote server 86 via a computer network 80. The network 80 comprises one or more wireless and/or wired network connections. For example, in some cases, images and other data can be transmitted over a mobile communication device network 42, such as a cellular telephone network, other mobile telephone network or via communication via a wireless access point based on Wi-Fi or other similar technology. A modem 44 may be used to facilitate data transmission across one or more of the network communication protocols 42. The computer network 80 can also comprise one or more connections across the Internet 82.

A memory unit 60 associated with the mobile device 20 may store a mobile point of sale insurance software application 90 (hereinafter, a POS application 90) as discussed below. Memory unit 60 may include random access memory 62 and read only memory 64. Further, memory unit 60 may comprise any one or more devices suitable for storing electronic data, e.g., RAM, DRAM, ROM, internal flash memory, external flash memory cards (e.g., Multi Media Card (MMC), Reduced-Size MMC (RS-MMC), Secure Digital (SD), MiniSD, MicroSD, Compact Flash, Ultra Compact Flash, Sony Memory Stick, etc.), SIM memory, and/or any other type of volatile or non-volatile memory or storage device. The POS application 90 may be embodied in any combination of software, firmware, and/or any other type of computer-readable instructions.

The POS application 90 and/or any related, required, or useful applications, plug-ins, readers, viewers, updates, patches, or other code for executing the POS application 90 may be downloaded via the Internet or installed on mobile device 20 in any other known manner.

A central processing unit 40 associated with the mobile device 20 may include a microprocessor, a microcontroller, a digital signal processor (DSP), an application specific integrated controller (ASIC), electrically-programmable read-only memory (EPROM), or a field-programmable gate array (FPGA), or any other suitable processor(s), and may be generally operable to execute the POS application 90, as well as providing any other functions of mobile device 20.

The mobile POS application 90 comprises one or more software modules that reside in the memory 60 of the mobile device 20 and may be implemented to execute the method taught by the invention. Through operation of the mobile POS application 90, the user 12 submits various information via the mobile device 20 to the system 10 which captures the submitted information in a customer information database 405. The customer information database 405 is a digital repository which receives and stores applicant information. The system 10 likewise includes a quote engine 410 that processes user applicant information and subsequently generates one or more insurance quotes 415 for consideration by the user applicant 12. Each quote is based on information submitted by the user applicant 12 and additional information obtained from other third-party databases related to the user applicant 12 and the vehicle 16 to be insured. The quote engine 410 generates one or more insurance quotes 415 and returns and displays the quotes 415 to the user applicant 12 via the display of the mobile device 20. The user applicant 12 may then select and accept one of the insurance quotes 415 via the touch screen of the mobile device 20. The system will then cause a proposed insurance policy 420 to be created for final evaluation and potential execution by the user applicant 12 and the insurance company 400.

Figure 2:
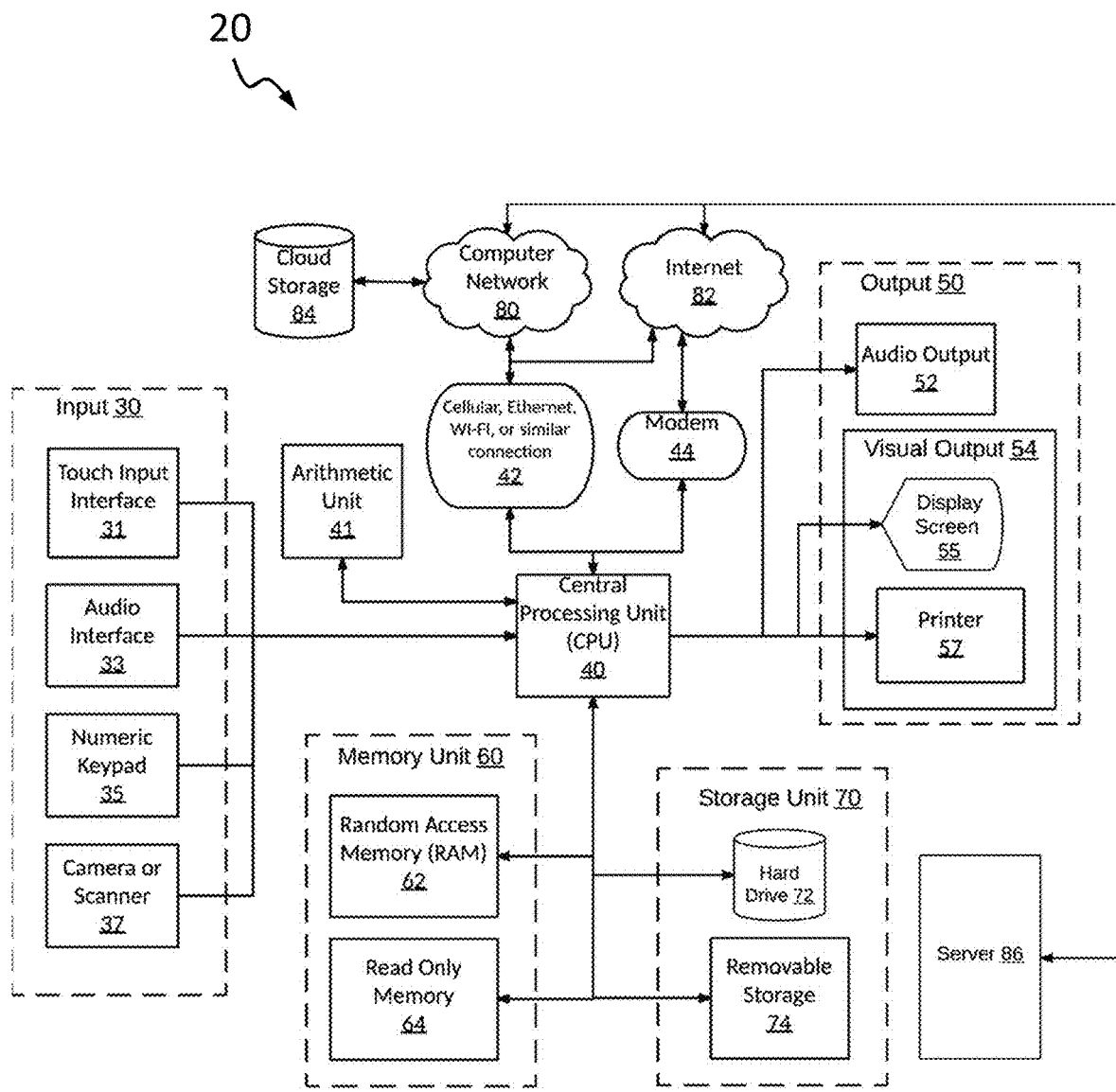
FIG. 2 is a diagram of various elements of a mobile computing device and supportive network infrastructure and peripherals utilized by the system, according to the present invention.

Referring now to FIG. 2, a schematic of the extended architecture associated with and supporting operation of the method and system 10 and the mobile device 20 is described. The mobile device 20 may be a tablet, smart phone or mobile phone. The POS application 90 leverages the capabilities of the mobile device 20, including: phone mode, voice recorder mode, SMS text mode, e-mail mode, digital camera mode, digital video recording mode, photograph gallery mode, video gallery mode, GPS mode, and other input devices, such as a touch screen, which minimizes the effort to collect, coordinate, administer and manage the desired data.

The mobile computing device 20 is configured to receive multiple forms of input 30, including but not limited to touch input 31, audio input 33 (e.g., voice recognition), numeric keyboard input 35, and camera/scanner input 37. The forms of input 30 used by the POS application 90 avoid manual input by a user 12 using a QWERTY keyboard.

Output 50 modes include audio output 52 and visual output 54, leveraging the display screen 55 and speakers of the mobile device 20, respectively. Visual output 54 can also be accomplished via delivery of information by the POS application 90 to a printer 57. The mobile computing device 20 comprises a central processing unit (CPU) 40 with an arithmetic unit 41 for processing instructions associated with the POS application 90. Although not shown in the illustration, the mobile computing device 20 may include other customized chips that assist in encryption or rendering of imagery.

The mobile device 20 further includes a memory unit 60 comprised of random access memory (RAM) 62 and read only memory (ROM) 64. The system 10 may supplement the mobile device 20 via the availability of data storage unit 70 to support various databases associated with the system 10. The system data storage unit 70 may be a hard drive 72 or removable storage 74. A hard drive 72 used for storage may be local or remote, connected to a network cloud storage 84 or network-attached storage device. The mobile device 20 may communicate via cellular, Wi-Fi, Ethernet or other applicable communication method 42 to reach a computer network 80 or the Internet 82.

Figure 3:
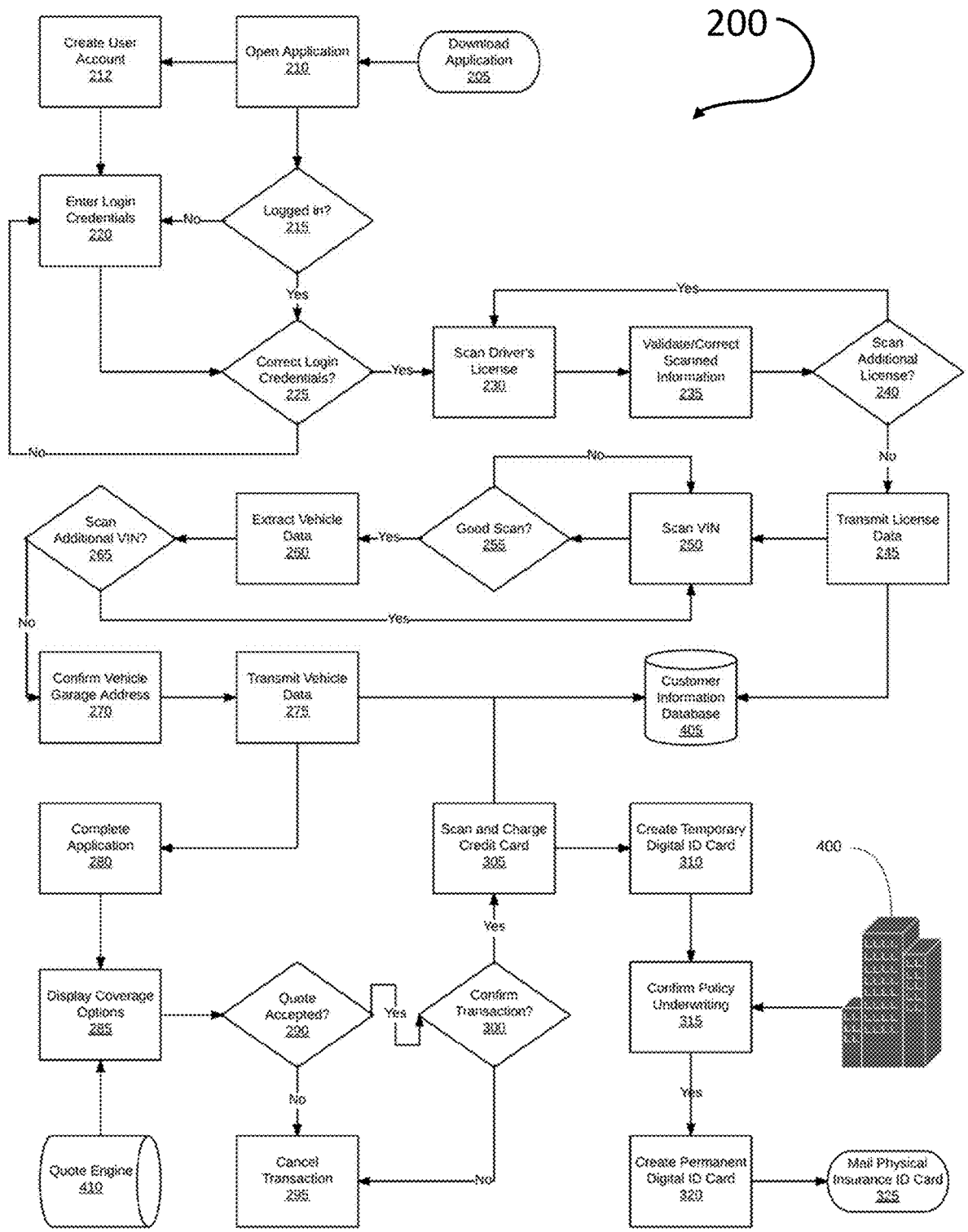
FIG. 3 is a flowchart of the insurance quote generation and acceptance method, according to the present invention.

Referring now to FIG. 3, a method 200 for rapidly obtaining an insurance quote 415 using a mobile computing device 20 while minimizing input errors and, where desirable, eliminating the need for interaction with insurance agents, is shown. First, in step 205, an user applicant 12 downloads a point-of-sale application 90 to the applicant's mobile computing device 20. The POS application 90 comprises one or more software modules configured to run on any of a plurality of mobile software environments including IOS, ANDROID, WINDOWS, and other mobile device operating systems.

In step 210, the user applicant 12 selects and launches the POS application 90 on their mobile device 20. In step 215, the POS application 90 confirms whether the user applicant 12 has previously logged into the system from a prior use. If the user applicant 12 has never logged in, in step 220 the POS application 90 prompts the user applicant 12 for login credentials including an email address and telephone number. When login credentials have been entered, or if the user applicant 12 was logged in from a previous session, in step 225 the user applicant 12 is presented with the submitted login credentials and prompted to confirm that the email address and telephone number are accurate. If the login credentials are inaccurate, the user applicant 12 is returned to step 220 to fix the error. Ideally, an email address is inputted using voice recognition to capture each letter, number and symbol associated with the email address.

Likewise, the applicant's telephone number is inputted using either voice recognition or a numeric keypad displayed on the screen of the mobile device 20, wherein the layout is equivalent to the dialing pad of a standard telephone. Various functions may be implemented after the submittal of email and telephone number to further qualify and confirm that the applicant is legitimate. In one instance, the POS application 90 will cause a confirmatory email to be sent to the email address provided. In another instance, the POS application 90 will cause a confirmatory text message or voice call to be transmitted to the user applicant 12. In an additional instance, two or more of these confirming methods may be used to confirm and qualify the identity of the user applicant 12.

Where available, the POS application 90 will confirm the geographic location of the user applicant 12 using GPS capability resident within the mobile device 20. Further, where access is authorized, the POS application 90 may collect both email address and phone number from information resident in the memory 60 of the mobile device 20.

Next, after having logged into the POS application 90, in step 230, the user applicant 12 is prompted to scan a licensed driver 14 driver license 15 via the camera 37. Typically the first driver license 15 scanned will be that of the user applicant 12. The mobile device 20 processes the captured image of the licensed driver 14 and extracts relevant information from the driver's license 15, including the licensed driver 14 name, address, age, gender, and other relevant information. In step 235, the user applicant 12 is presented with the extracted driver's license information and provided the opportunity to identify and correct any input errors caused by imperfect scanning. In step 240, the user applicant 12 is given the opportunity to scan additional driver licenses 15 representing additional drivers 14. If there are additional licensed drivers 14, the user applicant 12 may repeat the license imaging process from step 230 as needed. When all driver's licenses 15 have been imaged, imported and validated, in step 245, the POS application 90 causes the submitted data to be securely transmitted to a customer information database 405. The customer information database 405 may reside on a storage resource and server associated with an insurance provider 400 or with the system 10 for access by one or more insurance providers 400.

Still referring to FIG. 3, in step 250, the user applicant 12 is prompted to enter vehicle information. In step 250, the user applicant 12 uses the mobile device 20 to image or scan a vehicle identification number 17 using the camera 37. In step 255, the mobile device 20 attempts to process the image to extract the vehicle identification number 17. If the scan was unable to extract a vehicle identification number ("VIN"), the user applicant 12 is prompted to try again at step 250. If the VIN scan was completed successfully, in step 260 the mobile device 90 parses the scanned VIN 17 to identify the year, make, and model of the vehicle 16. In step 265, the user applicant 12 is prompted to scan additional VIN numbers 17, if the user applicant 12 has other vehicles that he wishes to insure, repeating from step 250 as necessary.

Once all vehicles 16 have been added, in step 270, the user applicant 12 is prompted to confirm the garage address 18 corresponding to each vehicle 16. The user applicant 12 may assign each vehicle 16 to any address previously identified during step 230, or, the applicant may submit an alternative garage address 18 using voice recognition or selection from a digital map. In step 275, the POS application 90 causes all VIN numbers 17 and associated garage addresses 18 to be transmitted across the network 80 and stored in the customer information database 405. In step 280, the user applicant 12 is prompted to complete the POS application process 200 by providing any additional information, accepting terms and conditions, and any other necessary application step prior to generating a quote. In each of these elements, additional information is preferably provided via voice recognition, interaction with screen choices, or biometric scanning.

Based on the licensed driver 14 and vehicle 16 information provided to the customer information database 405, a quote engine 410 generates one or more of insurance quotes 415 to be made available to the user applicant 12. In step 285, the system 10 causes the quote engine 410 to transmit data associated with the insurance quotes 415 to the mobile device 20 where the POS application 90 causes the one or more quotes to be displayed to the user applicant 12. In step 290, the user applicant 12 is prompted by the POS application 90 to select an insurance quote 415 from the available list. If the user applicant 12 indicates that there are no satisfactory insurance quotes 415, in step 295, the application process is aborted and canceled.

If the user applicant 12 does find a satisfactory insurance quote 415, in step 300 the user applicant 12 is prompted to confirm the transaction, select payment options and finalize the transaction. If the user applicant 12 declines to finalize the transaction, in step 295, the system 10 causes the transaction to be cancelled. If the user applicant 12 elects to confirm the transaction, in step 305, the user applicant 12 is prompted to scan a credit card using the camera 37 associated with the mobile device 20, or, select another payment method. Finally, the transaction is recorded and sent to the customer information database 405 for final processing.

Next, in step 310, the POS application 90 generates a temporary digital insurance identification card that contains relevant coverage information and serves as temporary proof of insurance until a complete insurance policy 420 is finalized and confirmed. The temporary digital insurance identification card may be displayed on the display screen of the mobile device 20.

Referring still to FIG. 3, in step 315, the insurance company 400 that issued the accepted insurance quote 415 reviews the terms of the quote and creates an insurance policy 420 between the user applicant 12 and the insurance company 400. In step 320, the issuing insurance company 400 authorizes the POS application 90 to create and display to the user applicant 12, now the insured, an official permanent digital insurance identification card referencing the confirmed insurance policy 420. The permanent digital identification card may be sent via email or made available for scanning and display from within the POS application 90. In step 325, the system 10 allows the issuing insurance company 400 to elect to send a physical copy of the permanent insurance ID card by postal mail or other carrier to the insured user applicant 12.

Figure 4:
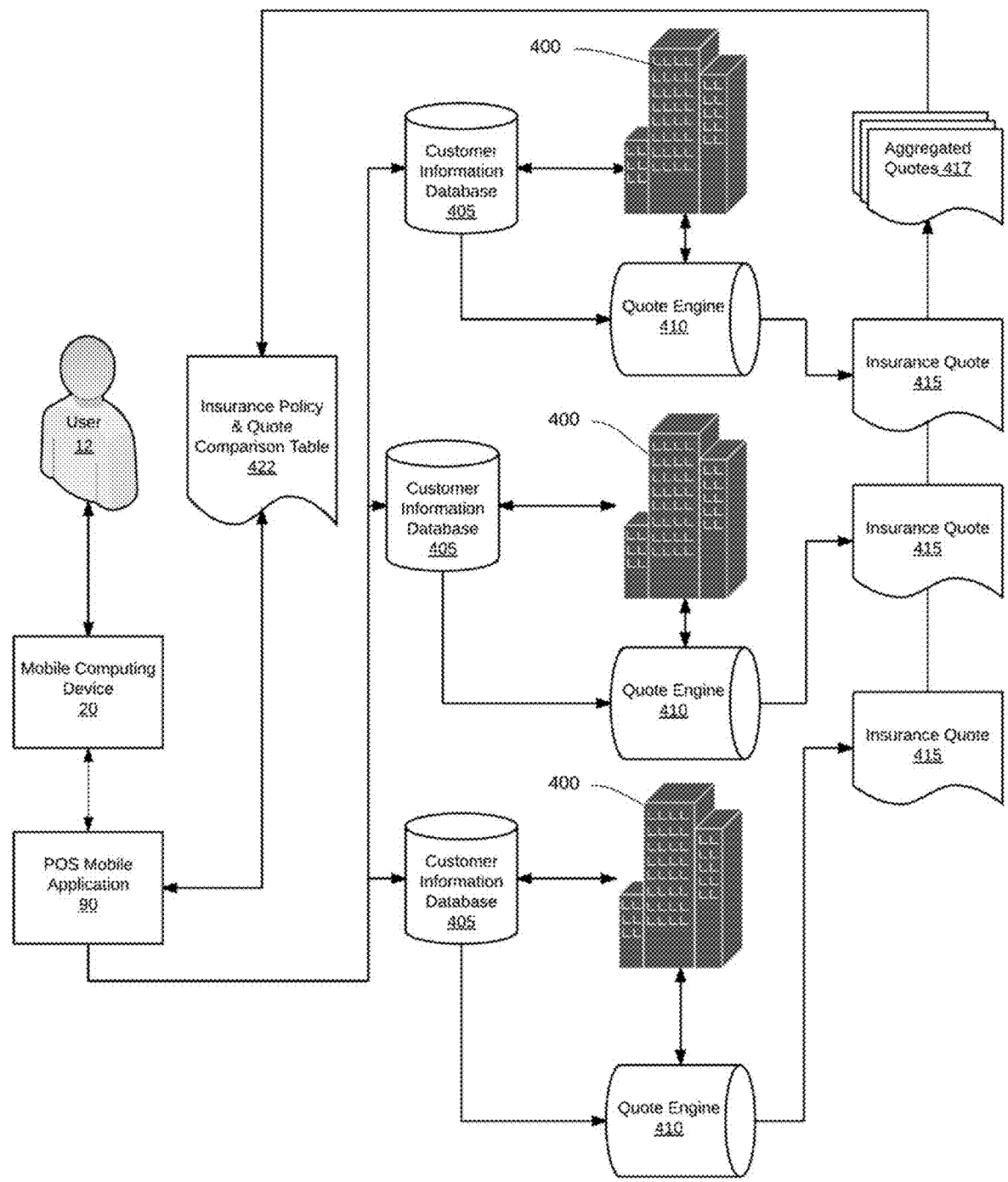
FIG. 4 is a diagram illustrating the simultaneous generation and presentation of insurance quotes from a plurality of insurance companies, according to the present invention.

Referring now to FIG. 4, in one embodiment of the system 10, the mobile POS application 90 will present one or more insurance quotes 415 from one or more multiple different insurance companies 400 simultaneously to the user applicant 12. According to the embodiment, the mobile device 20 simultaneously sends user data to a plurality of distinct customer information databases 405, each managed by a unique insurance company 400. Each insurance company 400 then processes the input user data via its own quote engine 410. The various quote engines 410 may follow different pricing protocols in generating insurance quotes, leading to a plurality of differing insurance quotes 415 generated by each insurance company 400. The data associated with the insurance quotes 415 from each insurance company 400 are aggregated 417 and transmitted to the mobile device 20 for further processing by the mobile POS application 90 to provide a table 422 for comparison of each of the proffered insurance quotes 415. The user applicant 12 may select one of these insurance quotes 415 to generate an insurance policy 420. The insurance policy 420 will be formed between the user applicant 12 and the insurance company 400 that presented the accepted insurance quote 415.

Figure 5:
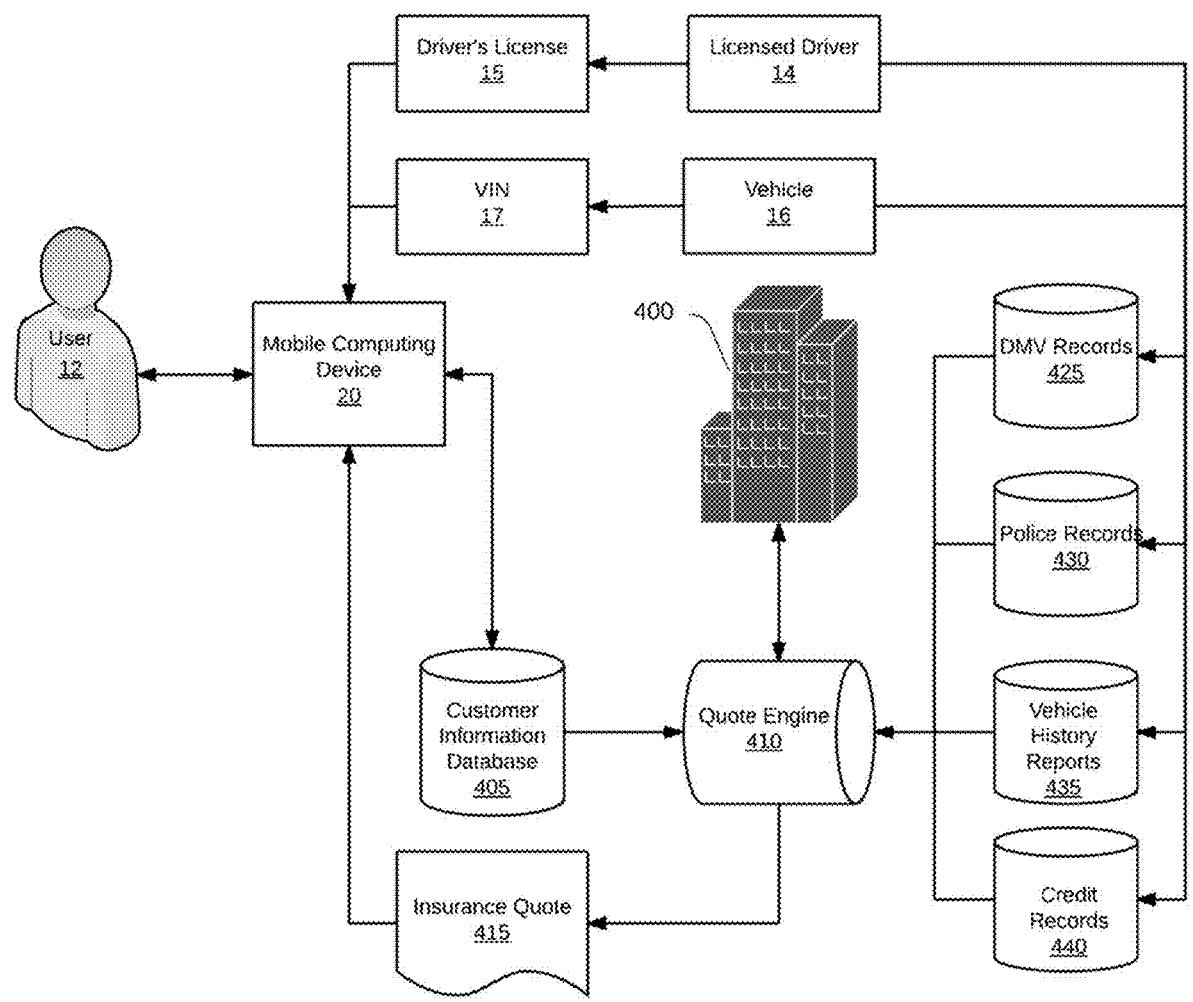
FIG. 5 is a diagram illustrating data collection resources associated with an exemplary quote engine, according to the present invention.

Referring now to FIG. 5, the quote engine 410 comprises one or more software-based algorithms configured to generate an insurance quote 415 based on data associated with input from a user applicant 12. As one of the objectives of the invention is to minimize errors in the creation of insurance quotes 415, the data collection process relies on information from sources other than data inputted manually by a user applicant 12 using a keyboard. For instance, rather than having a user 12 manually enter the vehicle make and year, or in the alternative manually enter the VIN 17, the vehicle make and year are extracted automatically from the scanned VIN 17. In a preferred embodiment, the POS application 90 will not allow an applicant to input the VIN 17 manually. Although this requirement might result in instances wherein the POS application 90 is unable to collect required data, where data is confirmed, the system 10, user applicant 12 and insurance company 400 will benefit from the accuracy of the collected data. In the event a user applicant 12 is encountering difficulties using the POS application 90 on the mobile device 20 to collect information, the system 10 will determine whether the POS application 90 is either out-of-date or corrupted and will direct the user applicant 12 to download a new or updated version of the POS application 90.

The quote engine 410 is configured to generate an initial quote 415 using information scanned from the VIN 17 and the applicant's driver's license 15. Information concerning licensed drivers 14 and vehicles 16 are routinely collected by a plurality of reporting agencies. These agencies may produce reports on a licensed driver 14 or vehicle 16 including DMV records 425 provided by a state DMV, police records 430 provided by police departments, vehicle history reports 435 provided by various private companies and user applicant credit records 440.

In the context of a driver's license 15, information presented on the front of the license 15 is available through imaging or scanning of a bar code on the back of the license 15. Scanning the bar code will cause the various fields in the insurance application to be populated with the appropriate information.

Vehicle history information comes from many sources including records on file from NMVTIS, state DMV, police records, fire & insurance records, data aggregators as well as many other proprietary sources. The National Motor Vehicle Title Information System (NMVTIS) is a database administered by the American Association of Motor Vehicle Administrators (AAMVA) & overseen by the US Department of Justice. NMVTIS is the only vehicle history database in the nation in to which all states, insurance carriers, & junk salvage yards are required by federal law to report their data. Accessing and correlating data via the NMVTIS will allow incorrect information to be flagged and corrected by the user applicant 12, and, allow an insurance company 400 to confirm that the information submitted by the user applicant 12 is accurate.

For example, the system 10 can access the NMVTIS to discover, among other things: a) information from a vehicle's current title, including the vehicle's brand history, e.g., whether the vehicle has a status of "junk," "salvage," or "flood"; b) the latest reported odometer readings; c) any determination that the vehicle is "salvage" by an insurance company or a self-insuring organization, including those vehicles determined to be a "total loss"; and any reports of the vehicle being transferred or sold to an vehicle recycler, junk yard or salvage yard.

In addition to accessing the NMVTIS, the system 10 will also supplement its records by accessing state vehicle records to confirm that completeness of the information gathered from the NMVTIS. Additionally, the system 10 will access other commercial databases, such as CARFAX, as appropriate, to ensure a complete vehicle information record and history.

Reports may be generated for a licensed driver 14 or vehicle 16 using only the driver's license 15 or VIN 17, respectively. To ensure accuracy, the POS application 90 does not provide for the entry of a manual driver's license number 15 or VIN 17. When a quote engine 410 is tasked with generating an insurance quote 415, the quote engine may extract additional information from these reports including driving records, accident history, and vehicle health, without requiring the user applicant 12 to manually enter the additional information. Instead, the user applicant 12 need only to scan the driver's license 15 and the VIN 17 as previously described.

In the event that the user applicant 12 is unable to submit information via the mobile device 20, the POS application 90 may display an icon that can be triggered by the user applicant 12 to directly call a data entry support person to assist in inputting all necessary information by speaking with the support person. This feature ensures that the user applicant 12 is able to submit information even where the mobile device 20 is unable to image or scan necessary items such as the driver's license 15 and VIN 17. Once the user applicant 12 contacts the POS application 90 support person, the method 200 associated with the invention is still implemented but the POS application 90 support person performs all data entry for the user applicant 12. The system 10 will still activate confirming and qualifying functions in the POS application 90 resident on the applicant's mobile device 20.

In a first embodiment, shown in FIGS. 6A-6W, exemplary views of a graphical user interface (hereinafter the "interface") for user interaction with the system 10 are shown. The illustrated interface are exemplary and other alternative interface designs and functionality may be implemented in association with the invention.

Figure 6A:
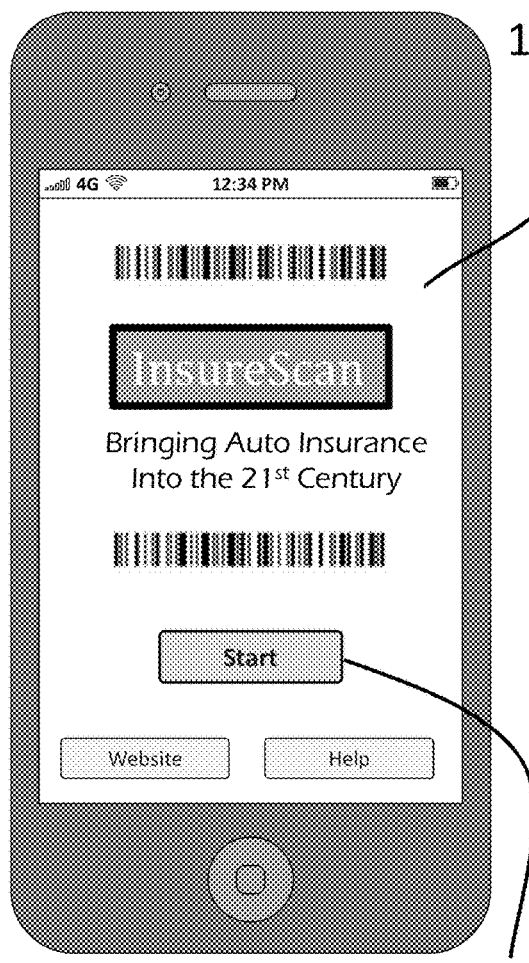
FIGS. 6A-6W are exemplary user interface screenshots associated with a first embodiment, according to the present invention.
Figure 6B:
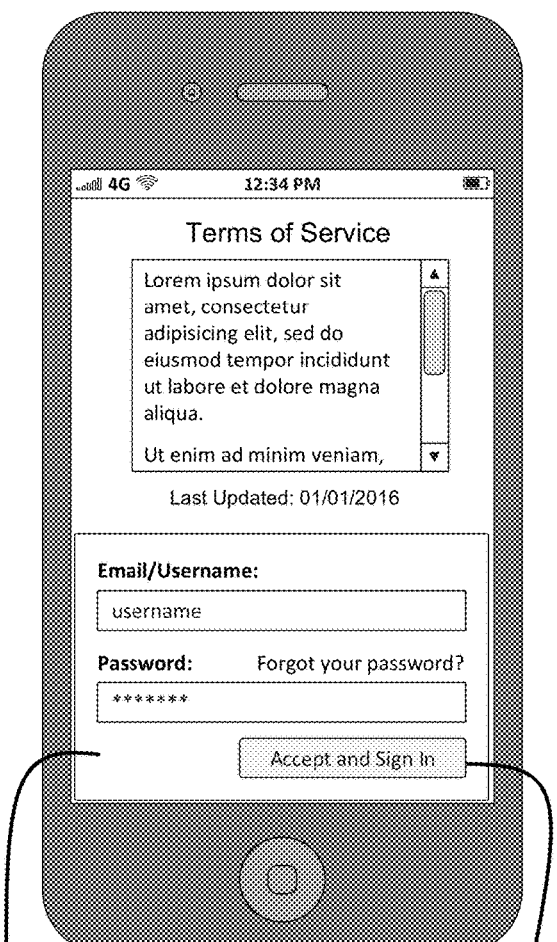

In FIG. 6A, a user 12 is presented with a splash screen 1010 and provided the options of starting the POS application 90, or going to a separate website or help page to learn more about the POS application 90. When the user 12 selects the "Start" button 1020, the user 12 is then presented with a login page interface, as shown in FIG. 6B, that includes terms of service and login fields 1030 requiring an email address or username along with an associated password. The user 12 may then accept the terms of service and sign in by touching the "Accept and Sign In" button 1035.

Figures 6C, 6D:
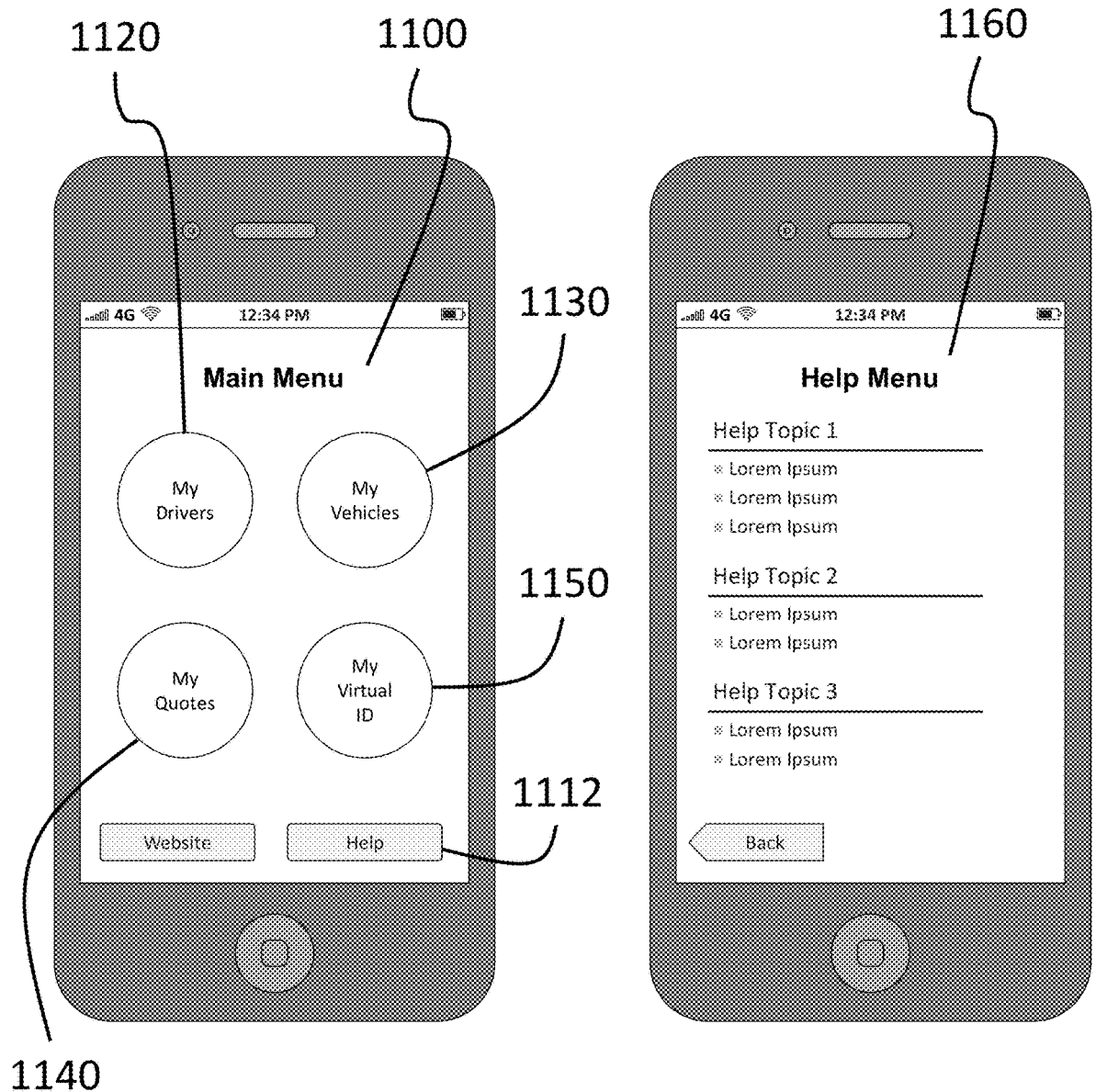

In FIG. 6C, the user 12 is presented with a "Main Menu" page interface 1100 which includes icons for selection: "My Drivers" 1120, "My Vehicles" 1130, "My Quotes" 1140, and "My Virtual ID" 1150. If the user 12 selects the "Help" icon 1112, the application 90 presents a "Help Menu" page interface 1160, illustrated in FIG. 6D, displaying various help topics that can be selected by the user 12 for further information. The Help Menu 1160 will also provide a number to call support directly.

Figures 6E, 6F:
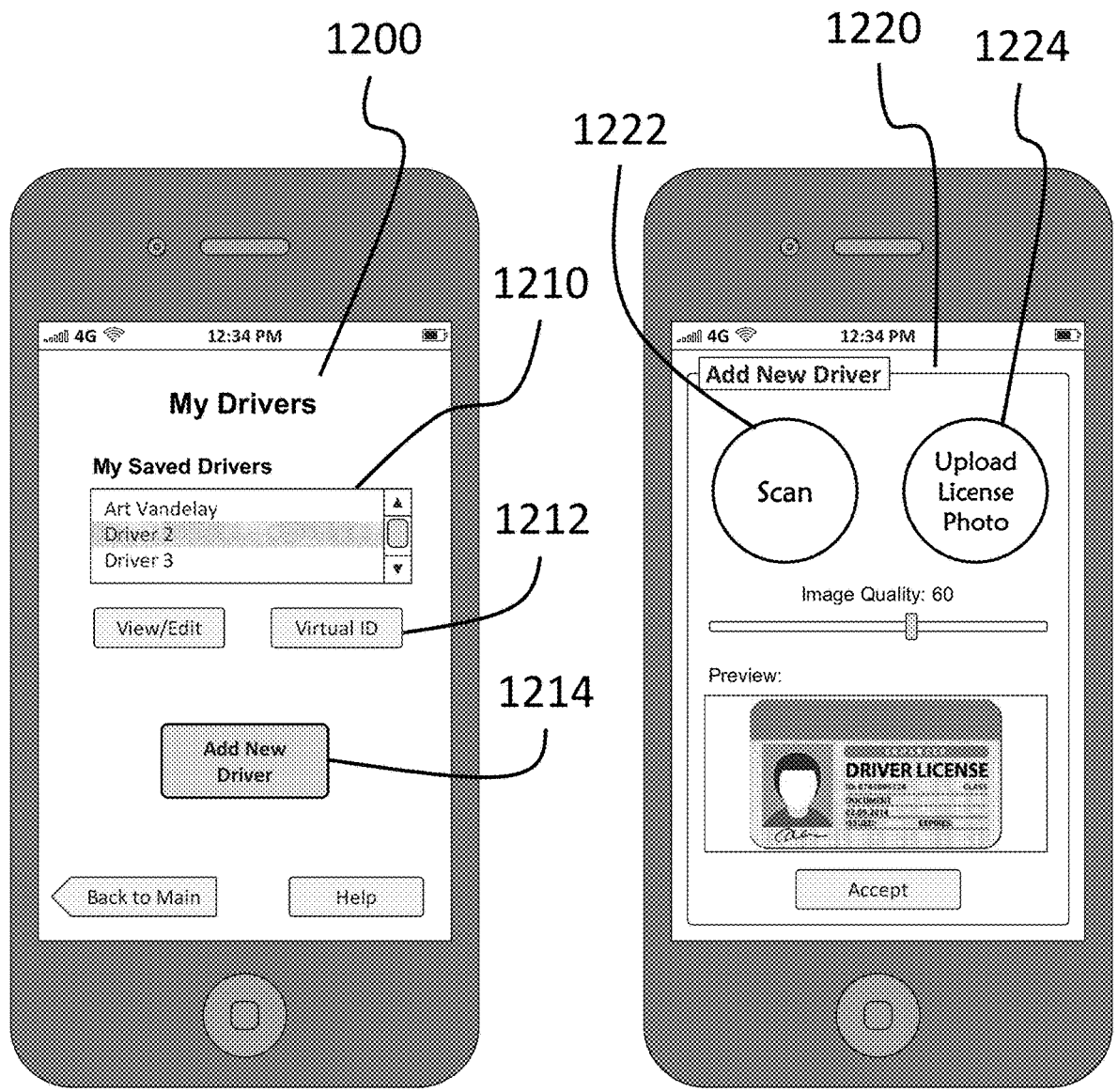

As shown in FIG. 6E, initially, the user 12 will select the "My Drivers" button 1120, wherein the POS application 90 will cause a "My Drivers" page interface 1200 to be presented to the user 12. At the My Drivers page 1200, the user 12 may be presented with a list of one or more drivers 1210 and has the ability to view and edit information associated with each driver 14. In the event this is the first use of the POS application 90 by the user 12, the user 12 will initially select "Add New Driver" 1214.

Figure 9A:
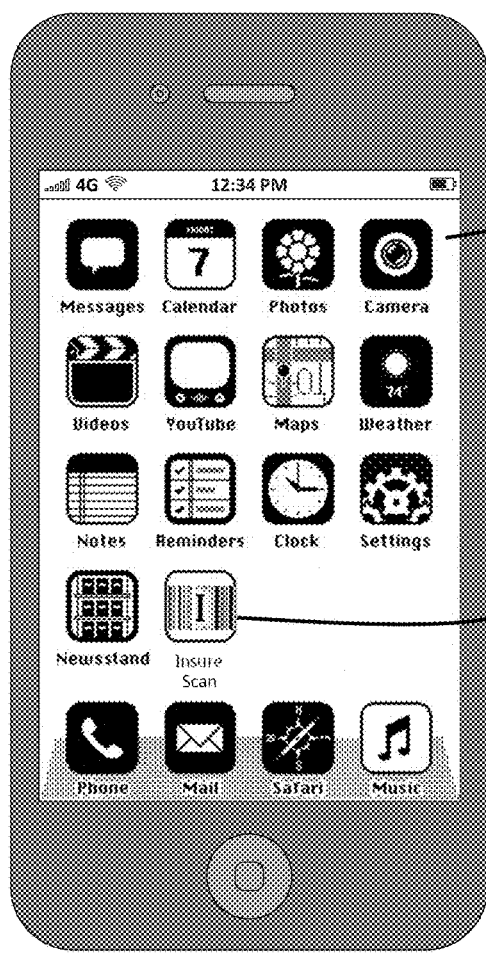
FIGS. 9A-9C are exemplary user interface screenshots associated with the home screen of a mobile operating system according to the present invention.

When the user 12 selects the "Add New Driver" button 1214, the POS application 90 will present a new "Add New Driver" interface page 1220 on the display screen 55 of the mobile computing device 20, as shown in FIG. 6F. Here, the user 12 can elect to scan a driver's license by touching the "Scan" button 1222, or upload an existing digital photo of a driver's license by touching the "Upload License Photo" button 1224. In addition, the user 12 may select the "Virtual ID" button 1212 which will cause the POS application 90 to present a new interface illustrating the user 12 virtual interactive insurance identification card, as shown in FIG. 9A.

Figure 6G:
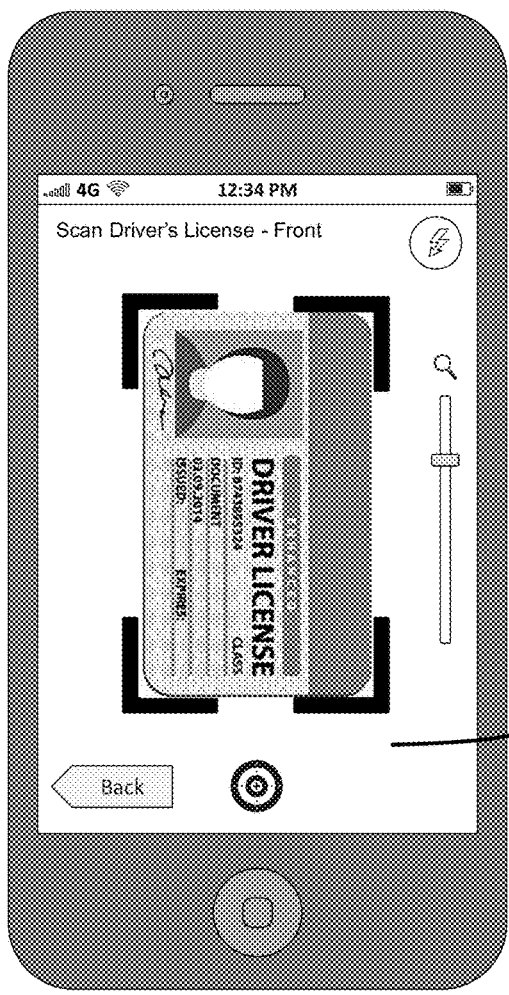
Figure 6H:
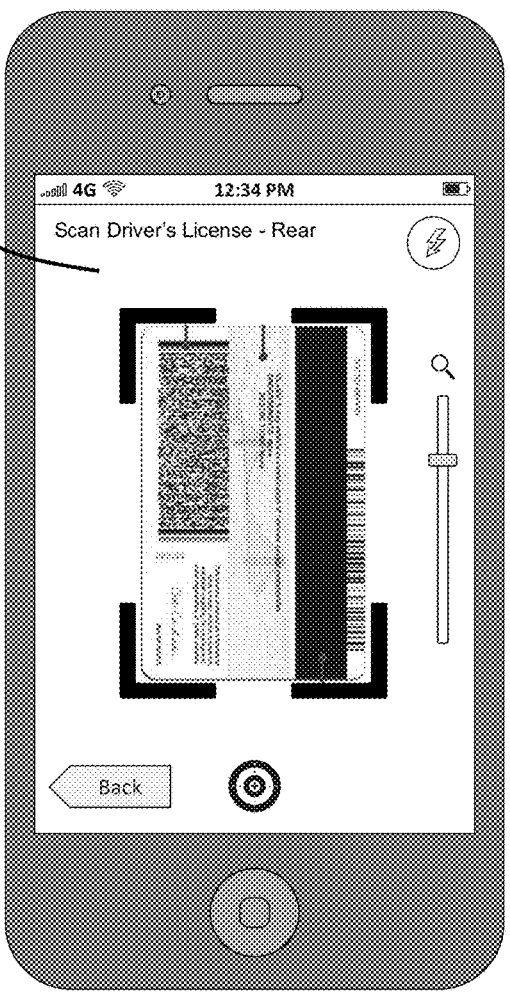
Figures 6K, 6L:
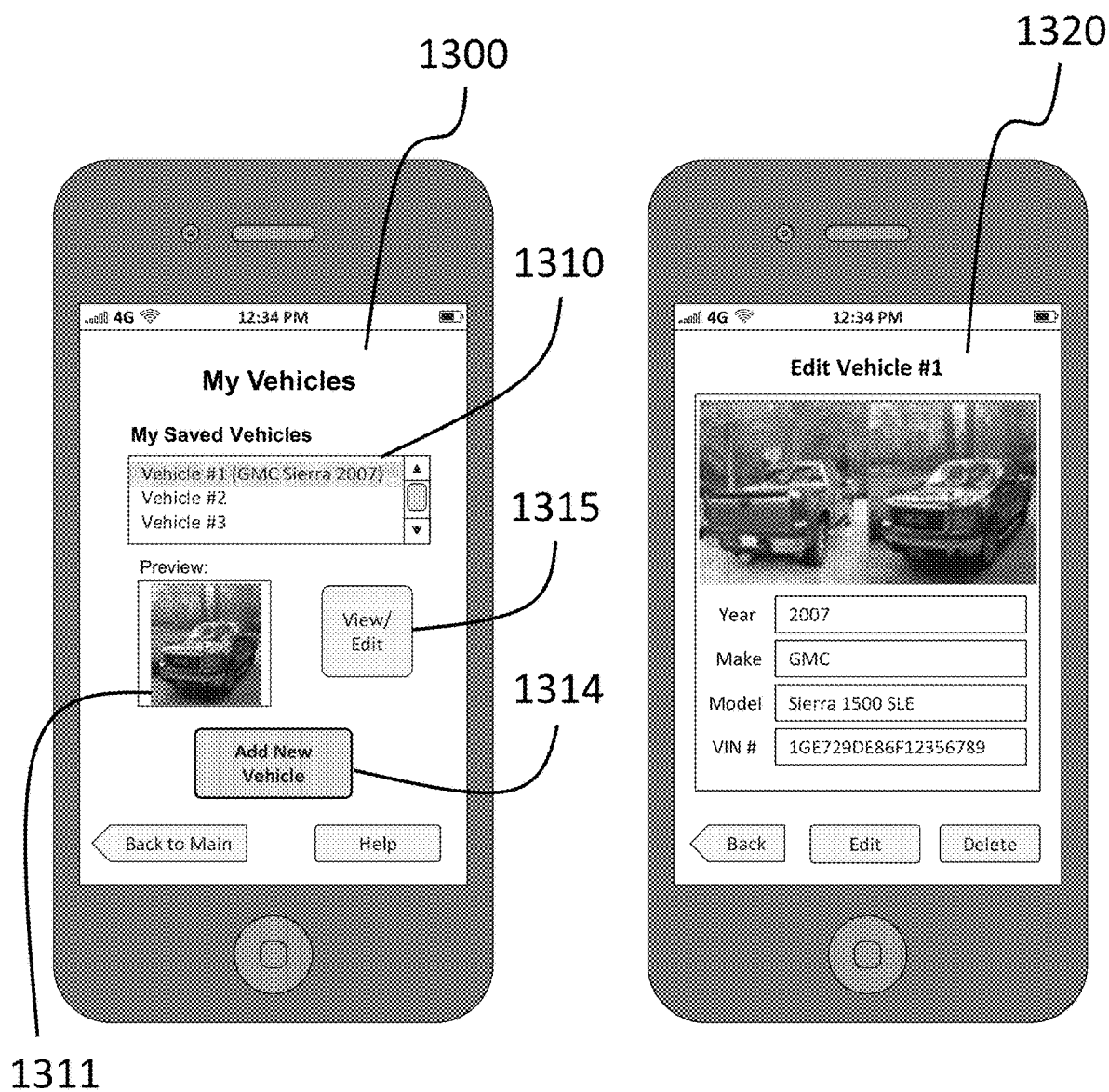

When adding a new driver 14, the POS application 90 presents a "Add New Driver" interface 1220 to the user 12. By selecting the "Scan" button 1222, the user 12 is presented with two interfaces 1230, 1235 shown in FIGS. 6G and 6H, which allow the user 12 to scan the front and rear of the driver's license 15. In FIG. 6G, when scanning the front of the driver's license 15, the driver's image and textual data are acquired by the mobile computing device 20 and textual data is optically recognized using optical character recognition software associated with the POS application 90. In FIG. 6H, when scanning the rear of the driver's license 15, one or more barcodes are imaged and then processed by the POS application 90 to extract the relevant driver information. The data from the front scan and rear scan are then compared against each other to ensure a match. If there are any discrepancies, the POS application 90 will point out any inconsistencies and provide the user 12 with the opportunity to speak to a support person to rectify the inconsistencies. The POS application 90 will not allow the user 12 to proceed further in the process until any discrepancies are resolved.

Referring now to FIGS. 6I and 6J, once discrepancies have been rectified, if any existed, the data extracted from the front and rear of the driver's license is automatically populated in the data fields for "Driver Information" 1240. The user 12 is given an opportunity to review the extracted information to ensure accuracy. If accurate, the user 12 may then "Accept" the data in the fields, verifying accuracy and causing the data to be stored in memory on the mobile computing device 20 for eventual transmission to one or more insurance companies 400.

Now, referring to FIG. 6K through 6P, exemplary user interface screens associated with collecting and verifying vehicular information are illustrated. Selecting the "My Vehicles" button 1130 on the Main Menu interface 1100 shown in FIG. 6C causes the POS application 90 to display the "My Vehicles" page 1300 to the user 12. At this page, the user 12 can review a list of vehicles 1310 and view or edit any information associated with each of the vehicles 16 in the list. The user 12 is presented with a vehicle image 1311 corresponding to the vehicle 16 selected in the list. Selecting the "View/Edit" 1315 button will cause an edit vehicle interface 1320 associated with the selected vehicle 16 to be displayed where year, make model and VIN # can be edited by the user, the vehicle 16 may be deleted from the list or the user 12 may merely confirm that the information is accurate and return back to the "My Vehicles" page 1300.

Figures 6M, 6N:
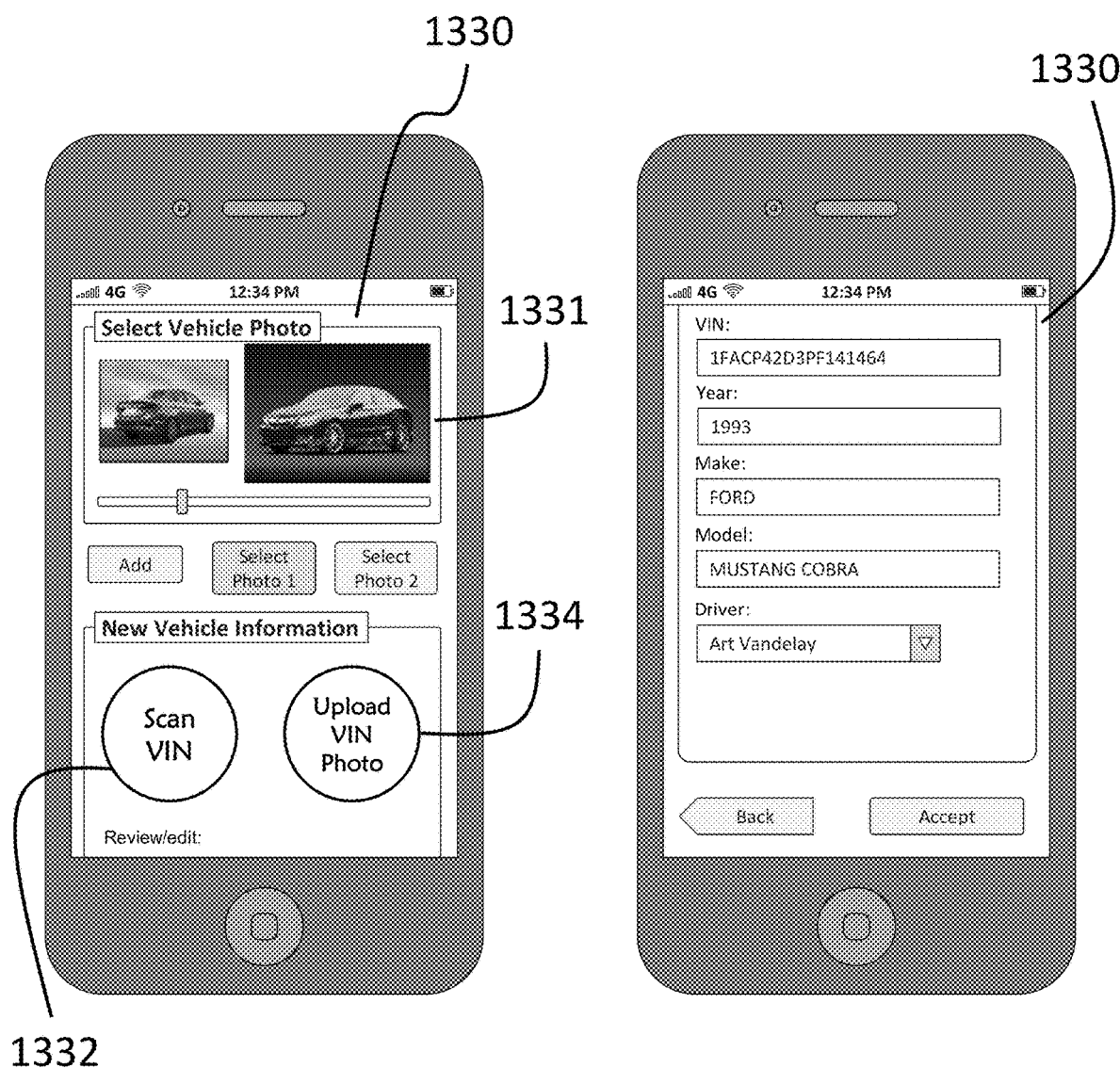

If additional coverage is required for an additional or new vehicle 16, the user 12 can select the "Add New Vehicle" button 1314. This action will cause the POS application 90 to display an add new vehicle interface 1330, as shown in FIG. 6M, where the user 12 can perform those steps necessary to collect information associated with the new vehicle 16. First, the user 12 may elect to add a new photo for the vehicle 16 or select photos corresponding to "Photo 1" and "Photo 2" from a gallery of vehicle photos 1331. Adding a new photo from device storage places the new photo in the gallery of vehicle photos 1331 for selection.

Next, the user 12 can elect to either "Scan VIN" 1332 of a new vehicle 16 or "Upload VIN Photo" 1334. In either case, the POS application 90 will extract the vehicular data from the image of the VIN tag and populate the vehicular data fields, as shown in FIG. 6N.

Figure 6O:
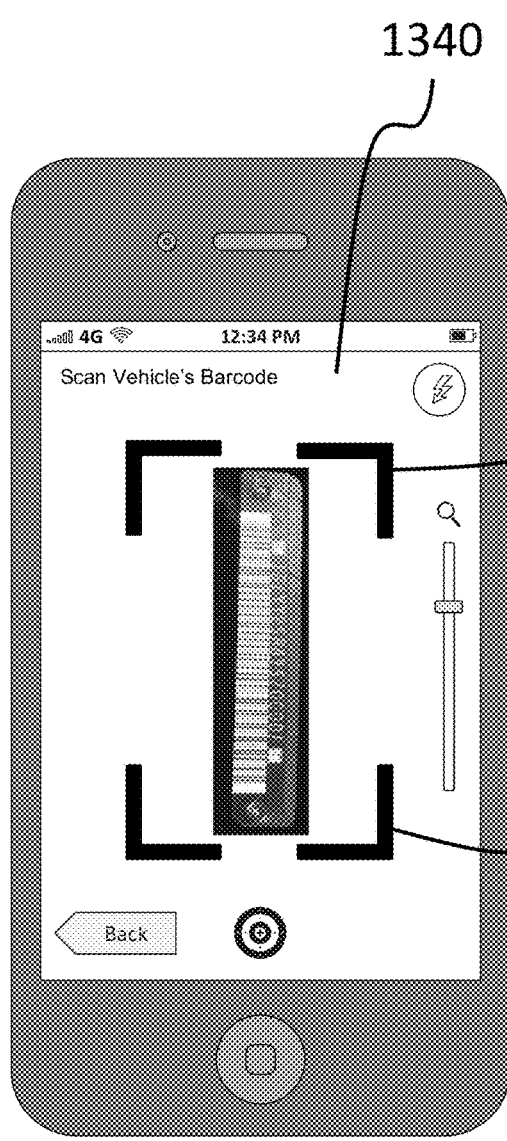
Figure 6P:
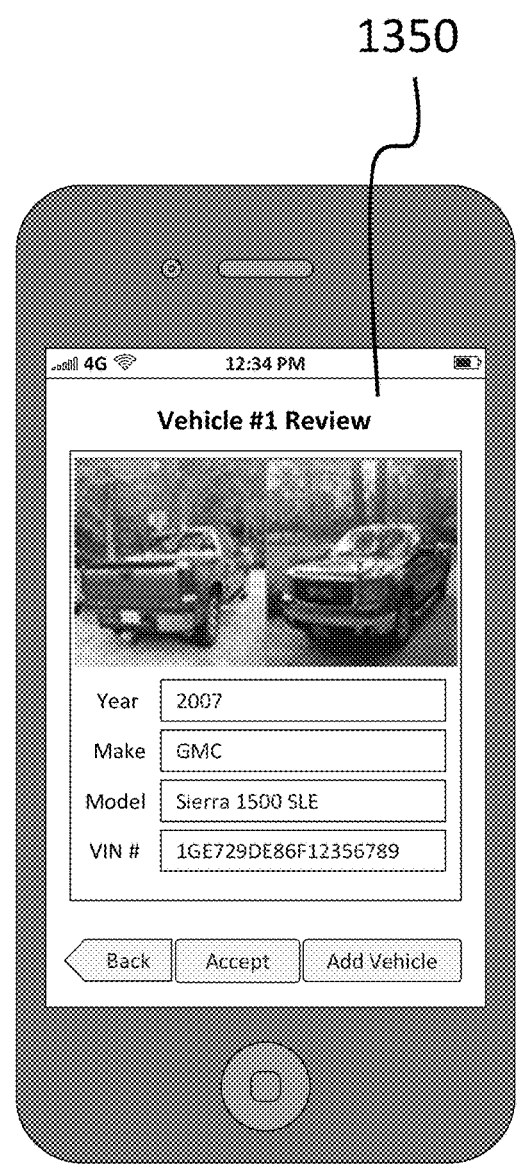

Referring now to FIG. 6O, a "Scan Vehicle's Barcode" interface 1340 is shown. Here, using the camera 37 of the mobile computing device 20, the user 12 positions the brackets 1347 on the interface such that the image of the VIN tag of the vehicle fully incorporate and fill the area within the brackets. The user 12 then triggers the camera 37 using the button to capture a photo of the VIN tag. The POS application 90 then processes the barcode and the numerical portion of the VIN tag to extract vehicular data. This information is then used to populate data fields in the vehicle information review interface 1350 shown in FIG. 6P which identify the particular vehicle 16 for which insurance coverage is being sought. At this juncture, the user 12 can "Accept" the information and then, can elect to add another vehicle 16 to the list, by selecting "Add Vehicle."

In addition to imaging the VIN tag, the system can perform optical character recognition of the VIN 17 below the bar code, or, the applicant can speak the numbers and letters provided below the barcode into the mobile computing device 20 to capture the VIN 17 to allow vehicular data to be extracted to populate the relevant data fields.

Figures 6Q, 6R:
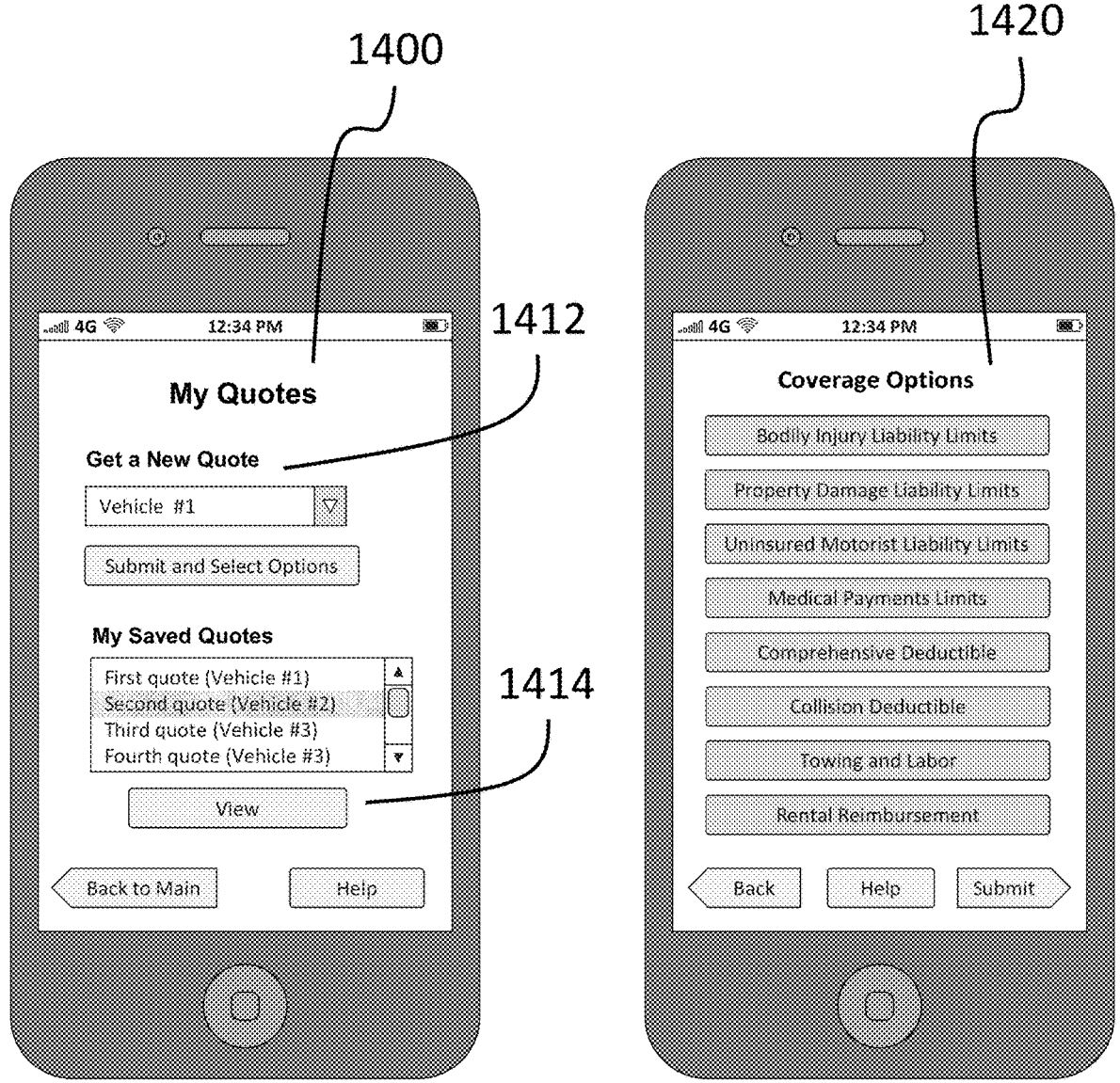
Figure 6S:
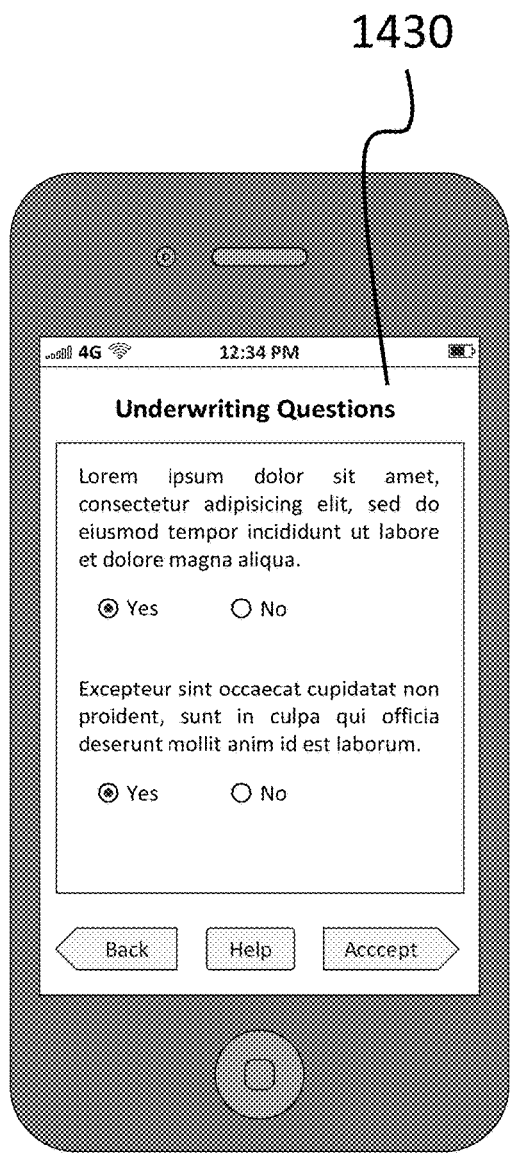

Having collected all driver 14 and vehicle 16 information via the POS application 90, the user 12 is returned to the Main Menu interface 1100 where the "My Quotes" button 1140 may be selected to cause the POS application 90 to present a new interface, the "My Quotes" page 1400 to the user 12, as shown in FIG. 6Q. Here, the user 12 may elect to get a new quote 1412, or view existing saved quotes 1414 for one or more vehicles.

If the user 12 elects to obtain a new quote 1412, the POS application 90 presents a new user interface, shown in FIG. 6R, which provides a listing of coverage options 1420 available for selection by the user 12. After coverage options have been chosen, the user 12 can submit the information via the POS application 90 which transmits the information collected information to one or more insurance companies, agencies or carriers 400. All information transmitted to the insurance company 400 is sent via an encrypted link to protect the personal information of the user 12 requesting insurance coverage.

If additional information is required by any of the insurance companies, agencies or carriers 400, an "Underwriting Questions" interface 1430 is displayed to the user 12. The questions are structured in a manner that only requires the user 12 to select a radio button, indicating "Yes" or "No." In another aspect, the underwriting questions may provide a list of options to select using radio buttons, drop down lists and other features available on the mobile computing device 20. Once all underwriting questions have been answered, the user 12 may then resubmit the information to the insurance company 400 via the POS application 90.

Figure 6T:
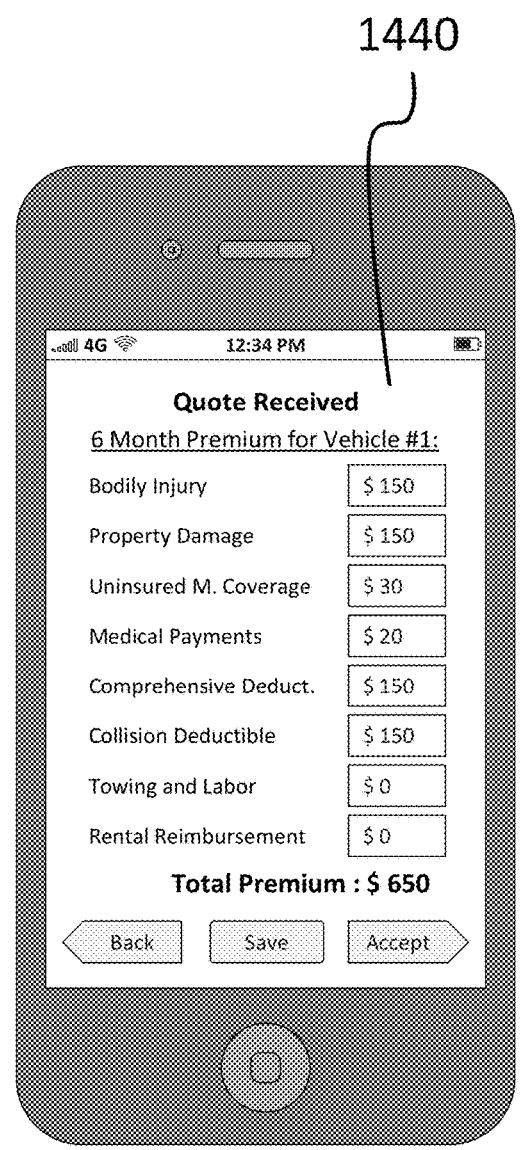
Figure 6W:

In FIG. 6T, having submitted all relevant and required information, the POS application 90 has communicated over the network 80 with one or more insurance companies 400 and one or more insurance companies 400 have provided insurance quotes 415 which have been received by the POS application 90. Each quote 415, in one aspect, is presented to the user 12 on a new quote page 1440. The user 12 may then elect to either "Save" the displayed quote for future reference, or "Accept" the quote. In another aspect, an aggregation 417 of the quotes are transmitted to the POS application 90 for display to the user 12 for comparison and evaluation.

Referring now to FIG. 6U, once the user 12 has accepted a quote 415, the "Purchase Options" page interface 1450 is displayed to the user 12 by the POS application 90. Prior to the presentation of the purchase options, in one aspect, the system 10 may have checked the user 12 credit history via one of the commercial credit record databases 440. This information may be used to establish credit options or deny credit, requiring payment in full prior to binding the insurance coverage.

Typically, regardless of the purchase option selected by the user 12, an initial payment may be required. For that purpose, as shown in FIG. 6V, the user is presented with a "Scan Credit Card for Payment" user interface 1460. As with scanning a driver's license or VIN tag, the user 12 will image a credit card by capturing an image of the credit card within the brackets 1467 presented on the displayed user interface 1460. Once the credit card has been imaged, the relevant information is extracted from the textual information and communicated to the insurance company using existing well-known methods for processing credit card payments. Once the credit card payment has been processed, the POS application 90 causes a confirmation of payment interface 1470, shown in FIG. 6W, to be displayed to the user 12. At this interface, the user can elect to view their associated "Virtual ID Card" 1473 or simply "Finish" 1475 the transaction. The user 12 is also provided with a phone number that can be called directly from this final interface by clicking on the hyperlink which will initiate the call on the phone or across WiFi using voice over interent protocols (VOIP).

FIGS. 7A-7E are illustrations of a virtual interactive insurance identification card 2000 according to the present invention. Ultimately, all of the information which has been collected for the insurance purchase transaction is aggregated with information concerning the insurance policy, its coverage provisions and resources available to access those resources. This aggregate information is transformed and associated with a digital insurance identification card 2100 upon completion of an insurance purchase transaction. A "My Virtual ID" button 2110 is presented on the face of the virtual interactive insurance identification card 2000. Selecting the button 2110 will cause the "My Virtual ID" interface 2200 to be presented to the user 12.

The POS application 90 will cause the "My Virtual ID" interface 2200 to supplant the initial login interface associated with the POS application 90 as the main interface for the user 12. The My Virtual ID 2200 will provide an interactive user interface still associated with the POS application 90, but primarily directed to access to consumer-centric requirements after purchase of insurance. Note that an agent using the POS application 90 would have no need for the My Virtual ID and thus, may not be provided with a My Virtual ID function as described below.

Figure 9B:
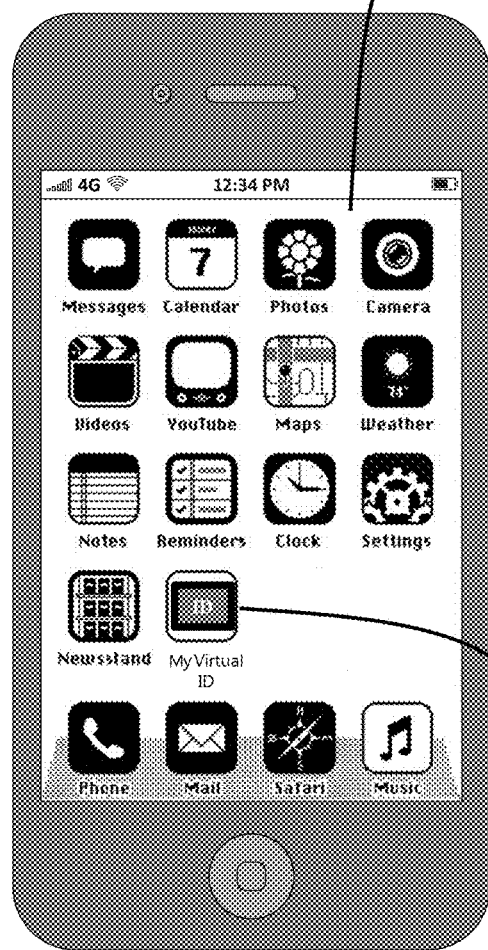

Referring to FIG. 9B, the My Virtual ID is readily accessible through an application icon 4200 placed preferably on the home screen of the mobile computing device 20. The My Virtual ID application icon 4200 may be selected at the home screen 4000, which will cause the POS application 90 to present a virtual interactive insurance identification card ("virtual ID card") 2000 to the user 12 on the display screen 55 of the mobile computing device 20.

Figure 7A:
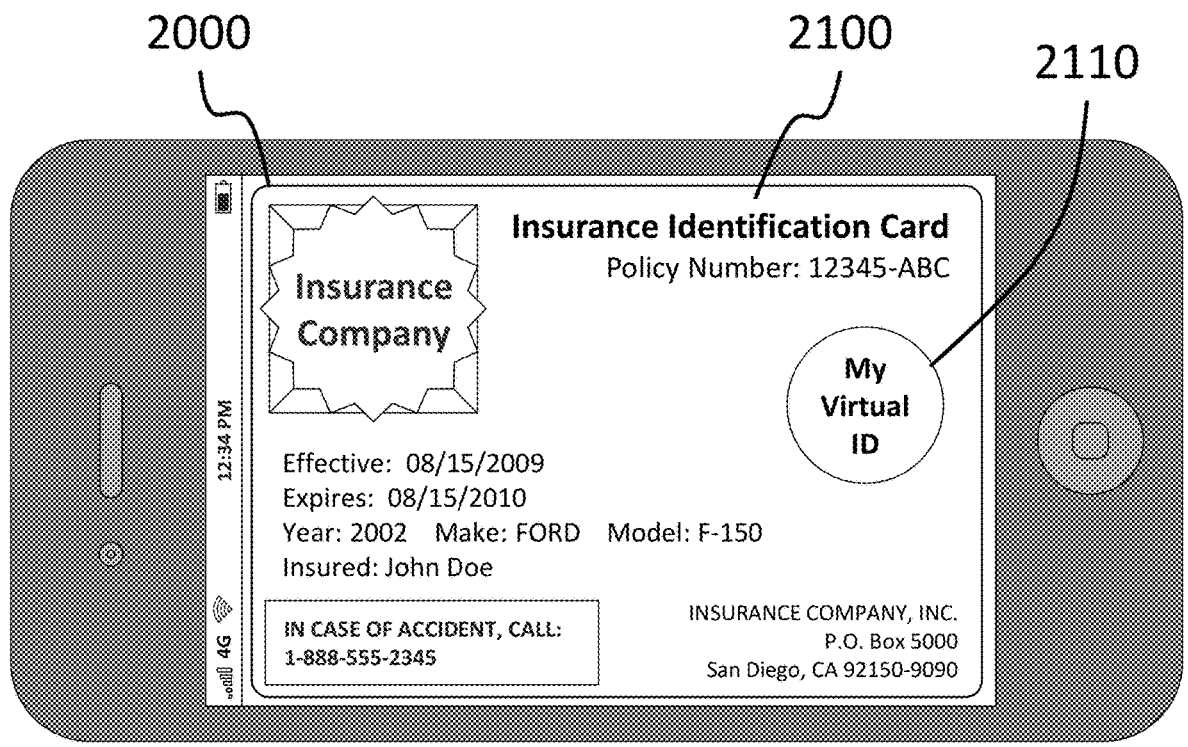
FIGS. 7A-7E are illustrations of a second embodiment supporting a virtual interactive insurance identification card and dashboard according to the present invention; and, FIGS. 8A-8L are exemplary user interface screenshots associated with a further embodiment, directed to use by agents, according to the present invention.
Figure 7B:
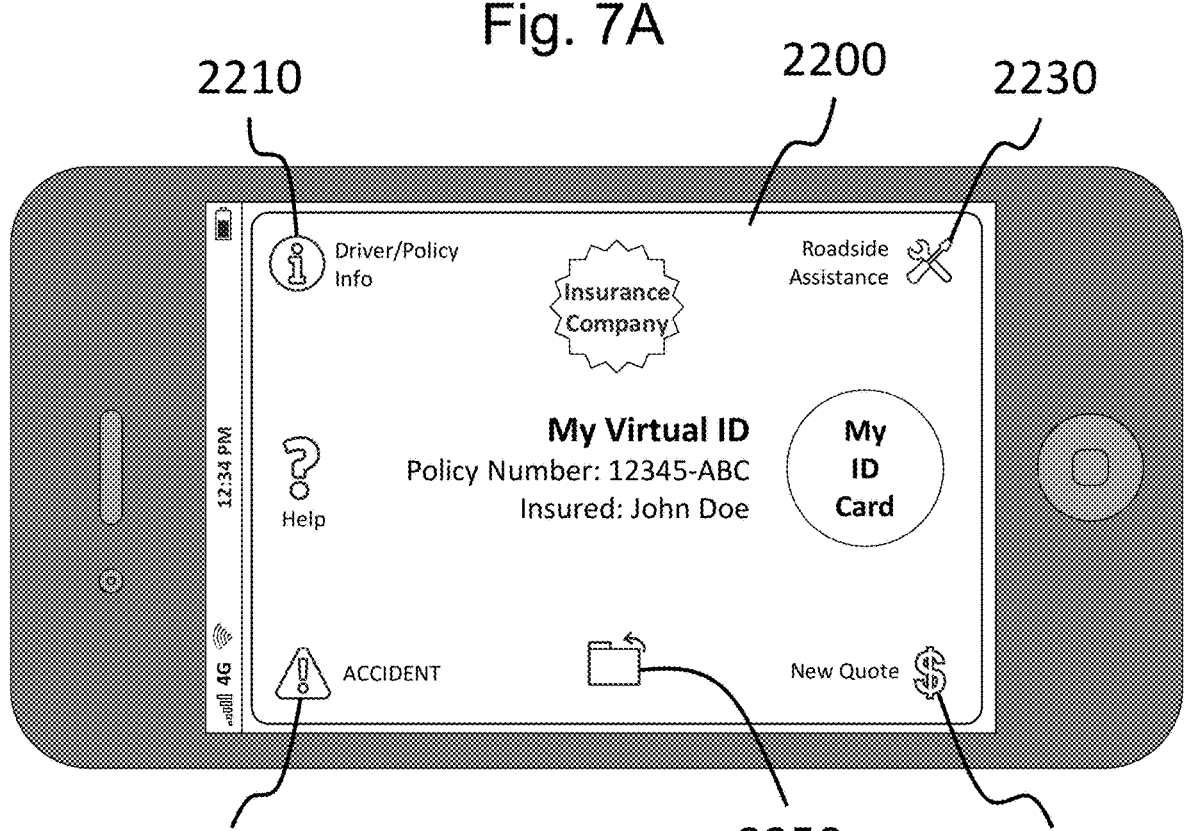

Referring to FIG. 7A and FIG. 7B, a front 2100 of the virtual ID 2000 contains summary information as well as interactive objects. For example, a user 12 may click on the hyperlinked phone number if involved in an accident. Additionally, the user 12 may select the "My Virtual ID" button 2010. In one aspect, selection of the "My Virtual ID" button 2010 causes the virtual ID card 2000 to flip as if exposing a rear 2200 of the card. On this new rear page 2200, additional features and functionality are accessible to the user 12.

First, via touch selection of the policy icon 2210, the user 12 may access a complete record of all driver, vehicular and insurance policy information, which will be displayed in a new policy interface.

Additionally, via touch selection of an accident icon 2220, the user gains access to an accident interface that provides functionality and information that will assist the user 12 in the event they have been in an accident.

Next, via touch selection of a roadside assistance icon 2230, the user 12 may access roadside assistance via a hyperlinked telephone number or a separate roadside assistance user interface that is in direct digital communication with the appropriate support group of the insurance company.

Still further, via touch selection of a dollar sign icon 2240, the user 12 may elect to request a new quote to determine if better coverage or lower prices are available.

In addition, via touch selection of a folder icon 2250, the user 12 may open a repository where data collected may be stored for future access. The repository can receive images or video from the camera 37 of the mobile device 20. The images may include, for example, pictures of damage to a vehicle, a video of the location surrounding an accident site, images of the placement of vehicles at the accident site, images of braking tire marks, images of the driver's license, vehicle registration certificate and hard copy insurance identification card for any parties involved in the accident, images of the other party involved in the accident, videos of statements from any witnesses that might be available to describe the accident and images of any other aspect that might prove useful for future submittal of claims or evidence to support fault or lack thereof. This information will be time stamped for future reference as necessary. Upon opening the repository, the user 12 will have the ability to automatically transmit all relevant information to the insurance company 400 or legal counsel for their records and use. Data transmittal will be restricted to those parties having a need to have access or to know the information to support the insured user 12.

Figure 7C:
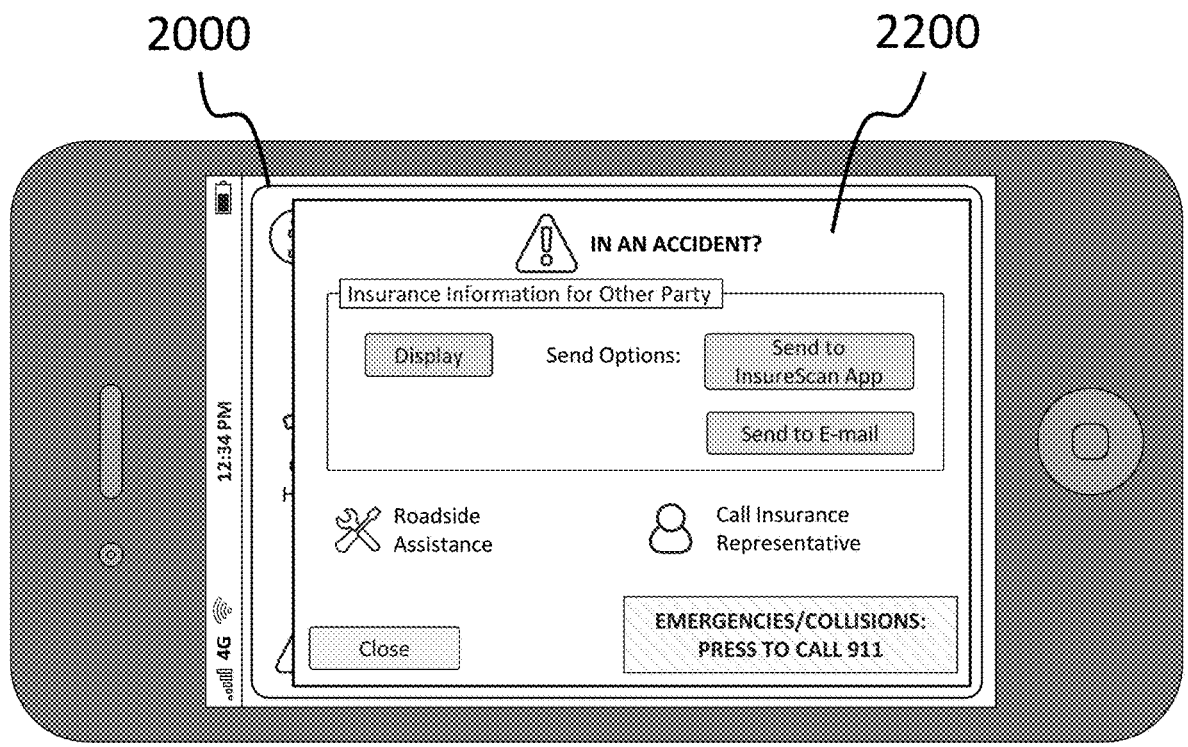

Referring to FIG. 7C, an exemplary screen is shown that illustrates the information and functionality made available to the user 12 through the virtual interactive insurance identification card 2000 when an accident occurs. The accident interface 2200 provides features and functionality that do not require textual keyboard interaction. All aspects that might be useful to a user 12 after a collision or other accident are conveniently provided in this accident interface and are accessible via touch selection. Such aspects include displaying or sending insurance information to another party, accessing roadside assistance, placing a call to an insurance representative, and calling an emergency number.

Figure 7D:
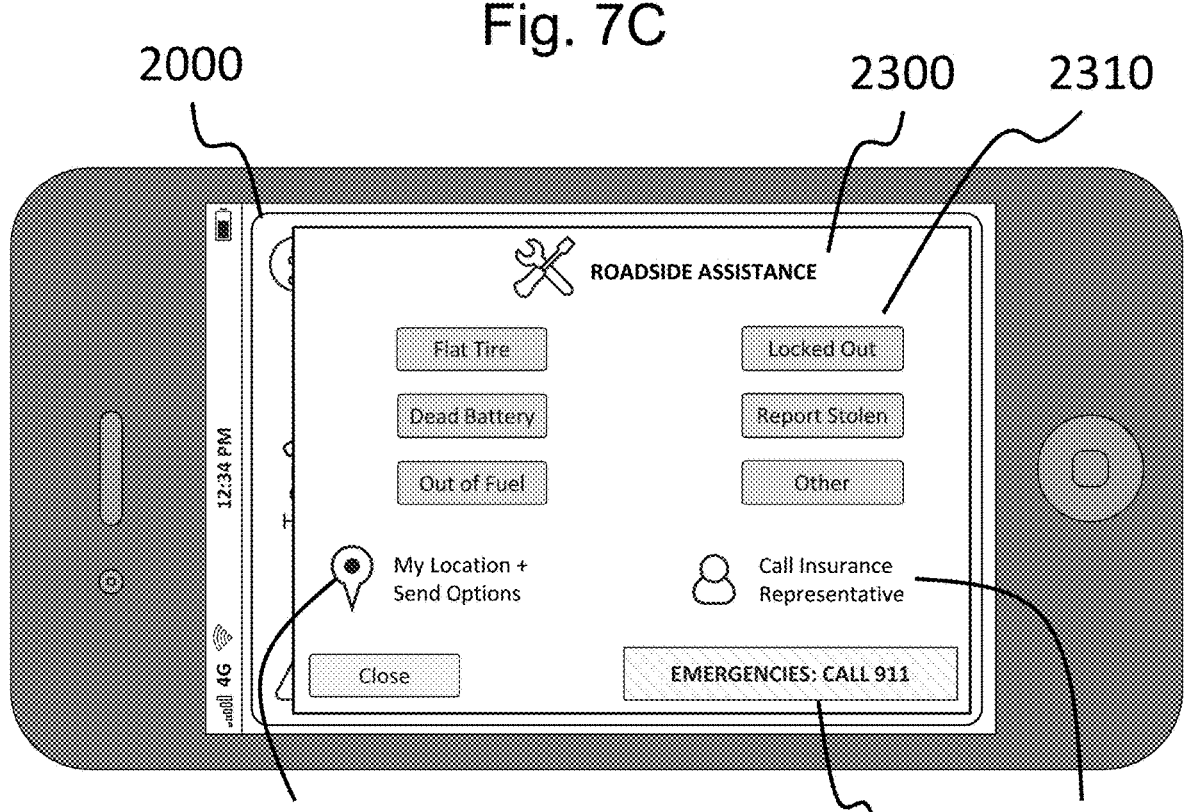

Referring now to FIG. 7D, in greater detail, an exemplary user interface associated with accessing roadside assistance is shown. This roadside assistance interface 2300 allows the user 12 to clarify what roadside assistance may be necessary by selecting any of the buttons 2310 which describe a particular circumstance, such as a flat tire, a dead battery, out of fuel, locked out of the car, report the car stolen or other. In addition to providing more specific information for the entity providing roadside assistance to the insured user 12, the user 12 is able to send their location to the insurance carrier via a "My Location" icon 2320. During an accident or when roadside assistance is required, the user 12 may not have a accurate awareness of the user's location and it is generally preferable to directly send location information to a support person, which can then be confirmed with the user 12. Another option is provided to allow the user 12 to select a "Call Insurance Representative" icon 2330 to call the user's insurance representative directly for advice. Finally, an alternative is provided to allow the user 12 to select an "EMERGENCIES" icon 2340 to call 9-1-1, which will simultaneously submit location information to the emergency line operator.

Figure 7E:
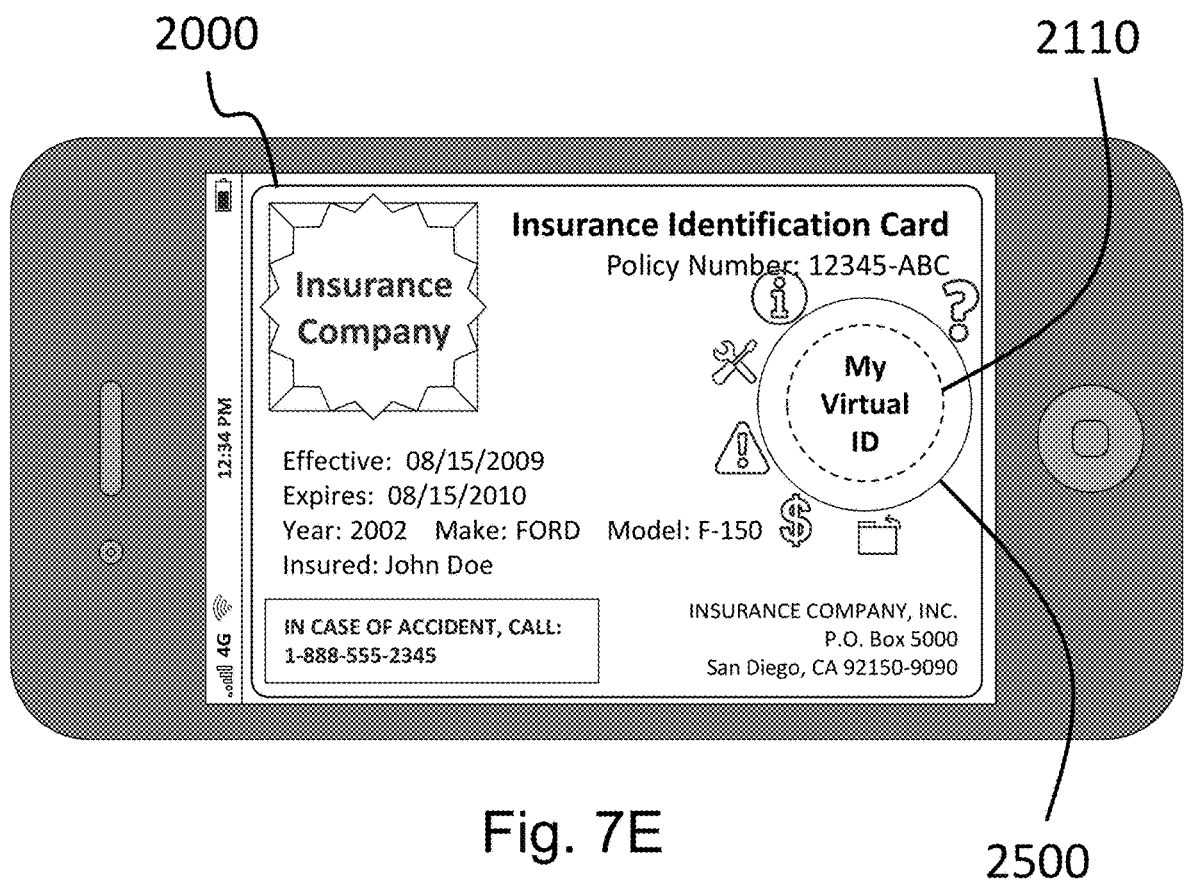

Referring to FIG. 7E, in an alternative embodiment of the present invention directed to the "My Virtual ID" virtual identification card 2000, a separate menu interface is provided where touching the My Virtual ID icon 2110 will cause a radial menu 2500 to extend from the icon presenting symbols consistent with those symbols shown on the rear interface 2200 for the virtual identification card 2000. Each of the icons associated with the radial menu 2500, which will be generally consistent with the icons associated with a rear interface 2200 of the My Virtual ID card will take the user 12 to the more detailed user interface associated with that particular icon.

Figure 8A:
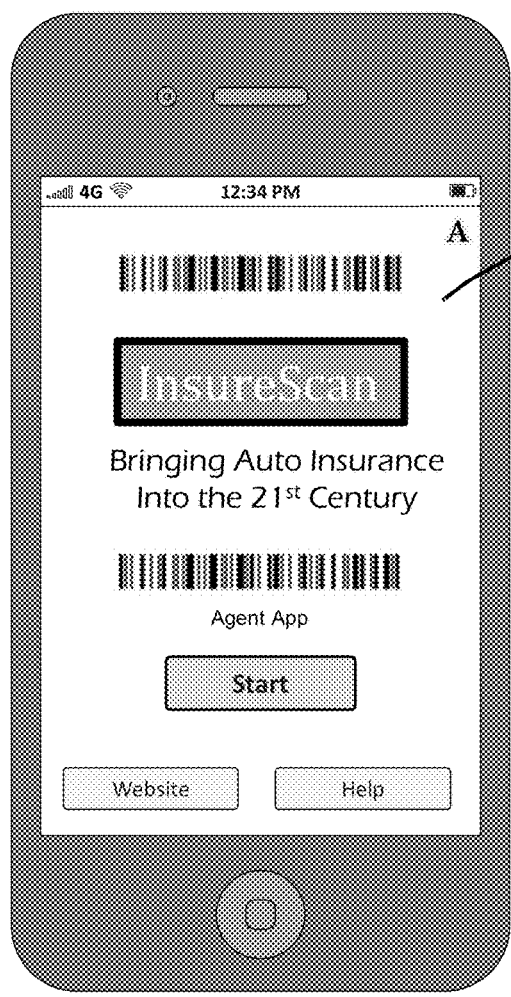
Figure 8B:
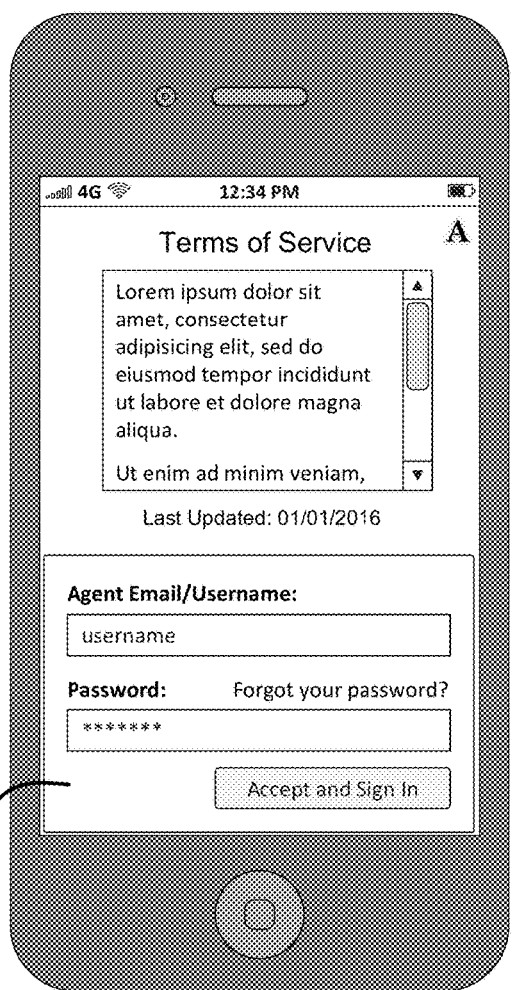
Figure 8C:
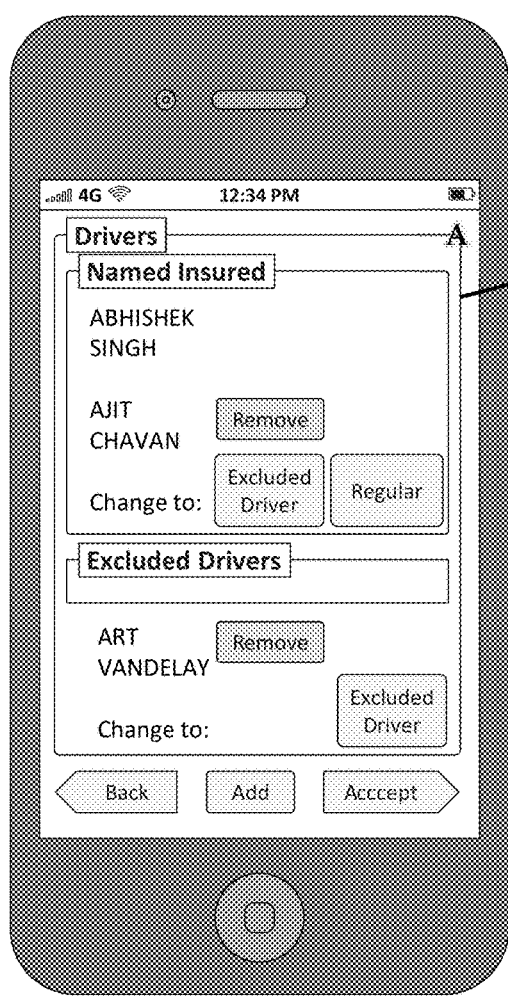

In addition to supporting a consumer-centric version of the system 10 along with the creation of the My Virtual ID card, the system 10 also provides a POS application 90 for use by an insurance agent. Referring now to FIGS. 8A-8L, exemplary user interface screenshots associated with a further embodiment of the invention, wherein the POS application 90 is operated by an agent rather than the consumer, are shown. FIG. 8A is an illustration of the initial agent interface 3010 for the agent version of the POS application 90. For clarity, each of the interfaces associated with the agent version of the POS application 90 are identified by an "A" in the upper right corner of each displayed interface. FIG. 8B is an illustration of the agent login interface 3030. FIG. 8C is an illustration of information associated with various drivers for a particular account. In this interface 3200, the status of various drivers may be changed to "Excluded" or "Regular." In addition, a driver 14 may be removed from the list.

Figure 8D:
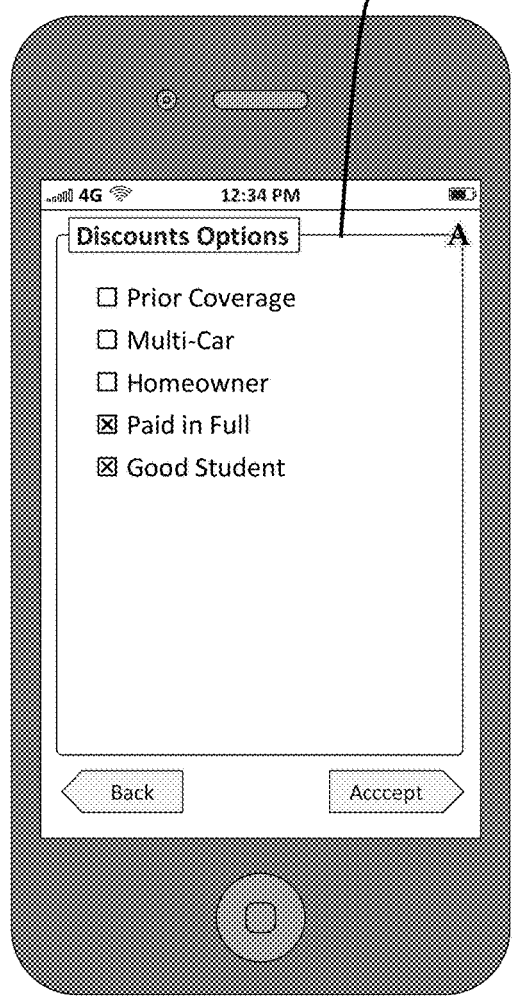
Figure 8E:
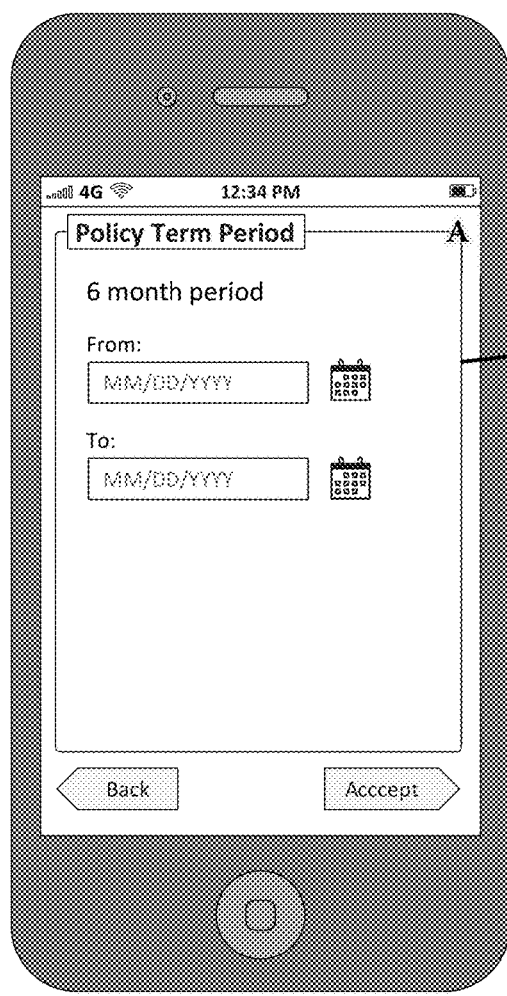
Figure 8F:
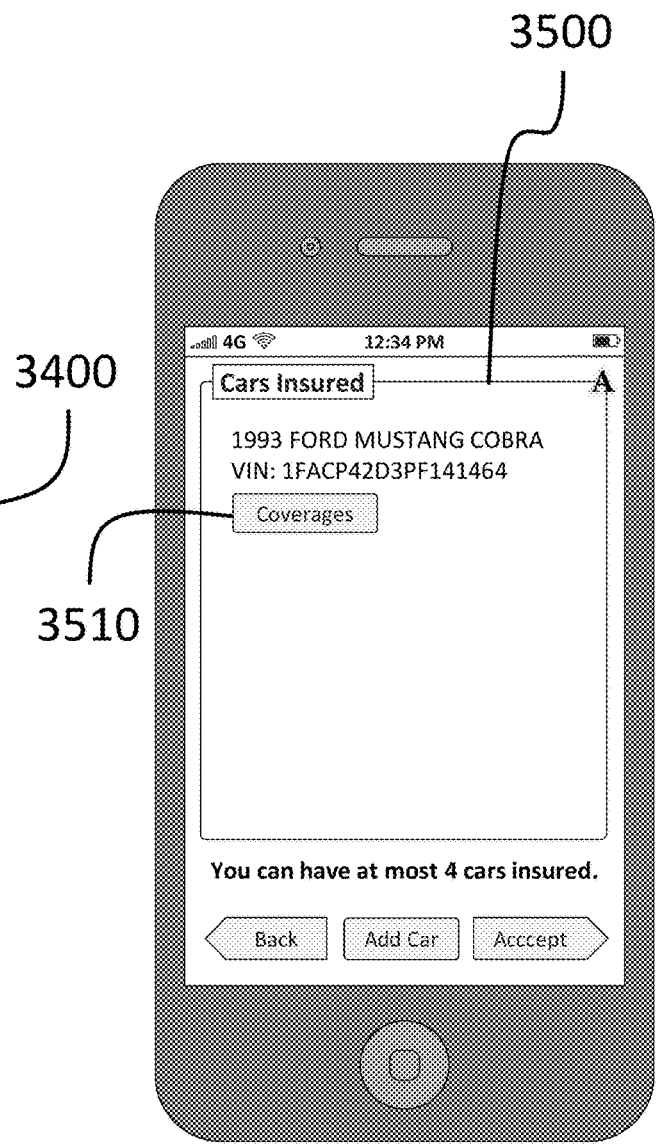
Figure 8G:
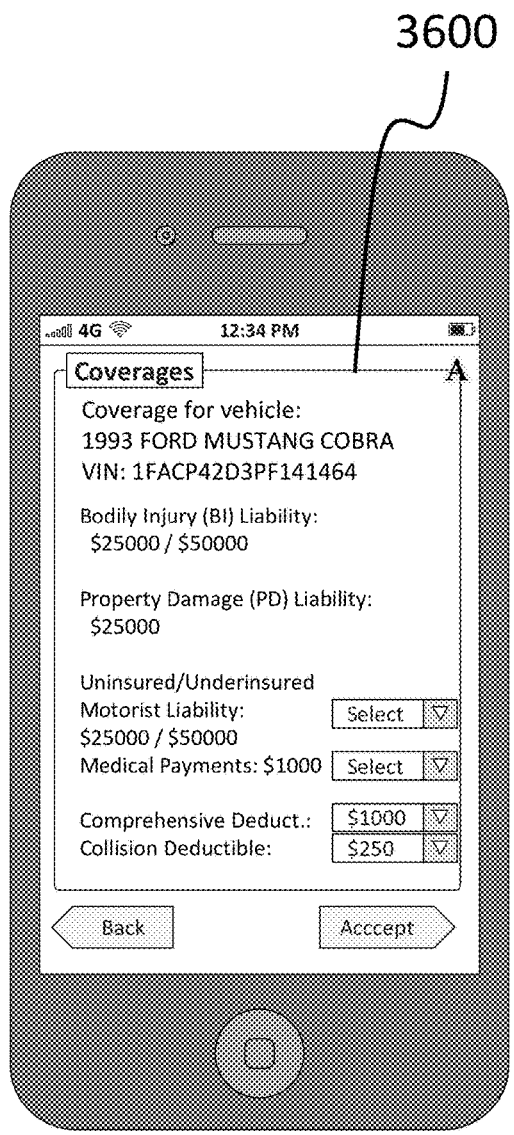
Figure 8H:
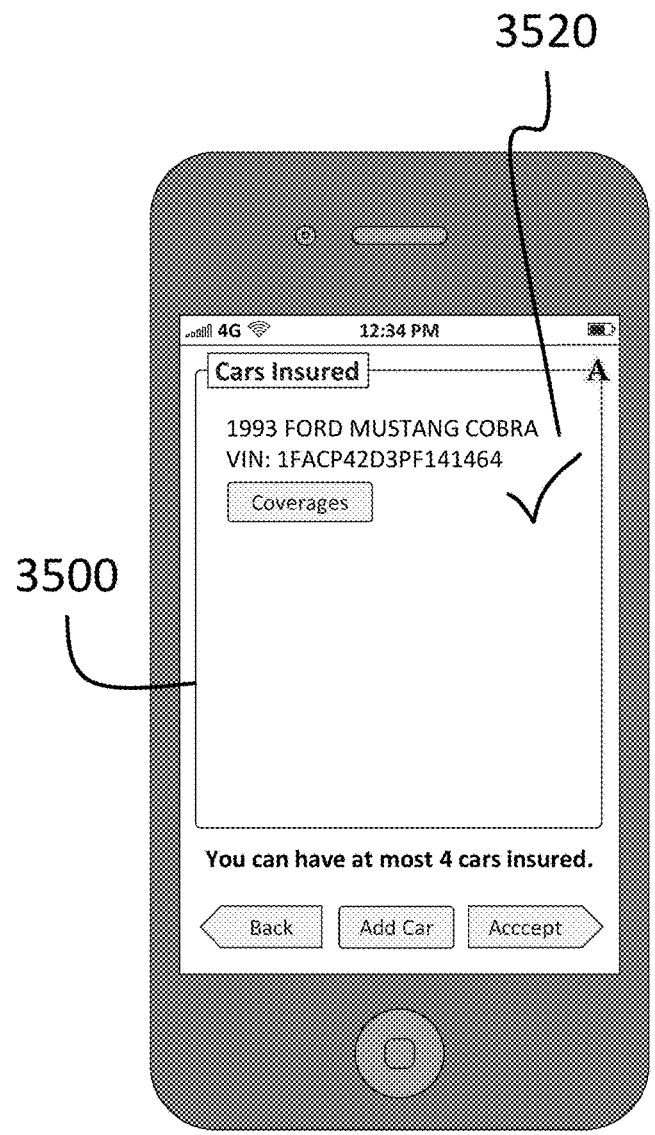
Figure 8I:
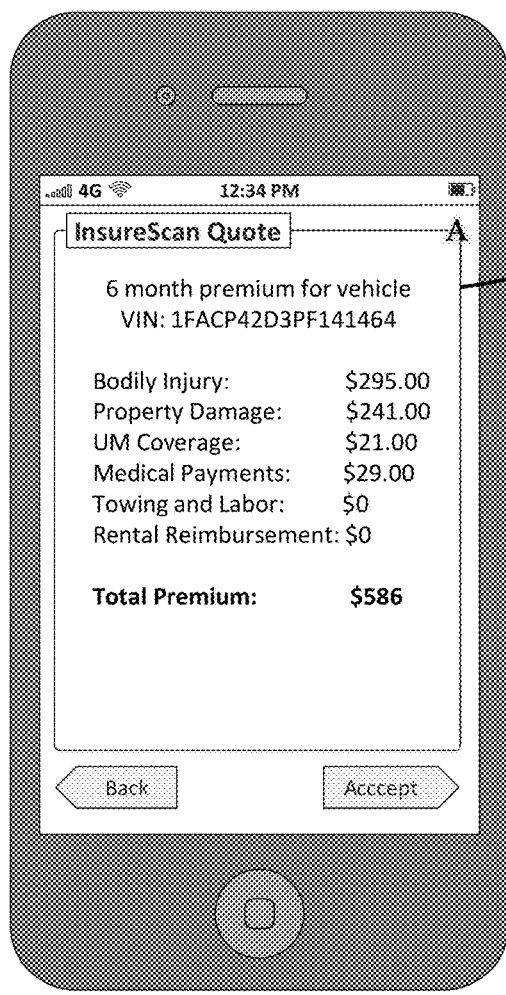
Figure 8J:
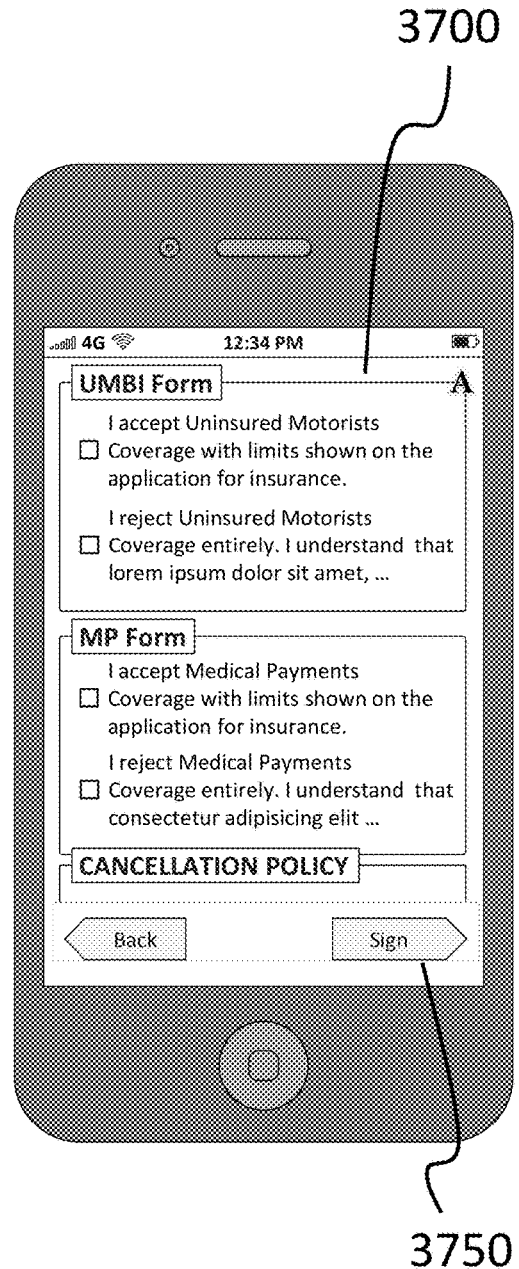

In FIG. 8D, an agent interface listing the "Discount Options" 3300 is provided to the agent/user 12. In FIG. 8E, the agent is presented with an interface that allows selection of a "Policy Term Period" 3400. In FIG. 8F, the agent is presented with an interface providing a list of "Cars Insured" 3500. Additional cars may be added to the coverage from this interface. The "Coverages" button 3510 may be selected to present the agent with a "Coverages" interface 3600, shown in FIG. 8G, where types and levels of coverage may be selected. In FIG. 8H, the "Cars Insured" interface 3500 for the particular insured party is again displayed to the agent. A visual checkmark icon 3520 is displayed to show that the coverages have been entered and confirmed for the associated vehicle 16. In FIG. 8I, the agent is presented with an interface 3600 describing details of a quote received and to be presented to the applicant to "Accept" or reject. In FIG. 8J, additional certifications which may be required to allow the requested insurance to be underwritten are presented to the agent in a form interface 3700 for presentation to the user where selections can be made. Finally, by selecting the "Sign" arrow 3750, as shown in FIG. 8K, the agent is presented with a signature field 3800 where a digital signature may be provided by an applicant using a finger or a stylus. In FIG. 8L, "Payment Information" 3900 is acquired, once again by scanning a credit or debit card which causes the various data fields to be populated.

Figure 9C:
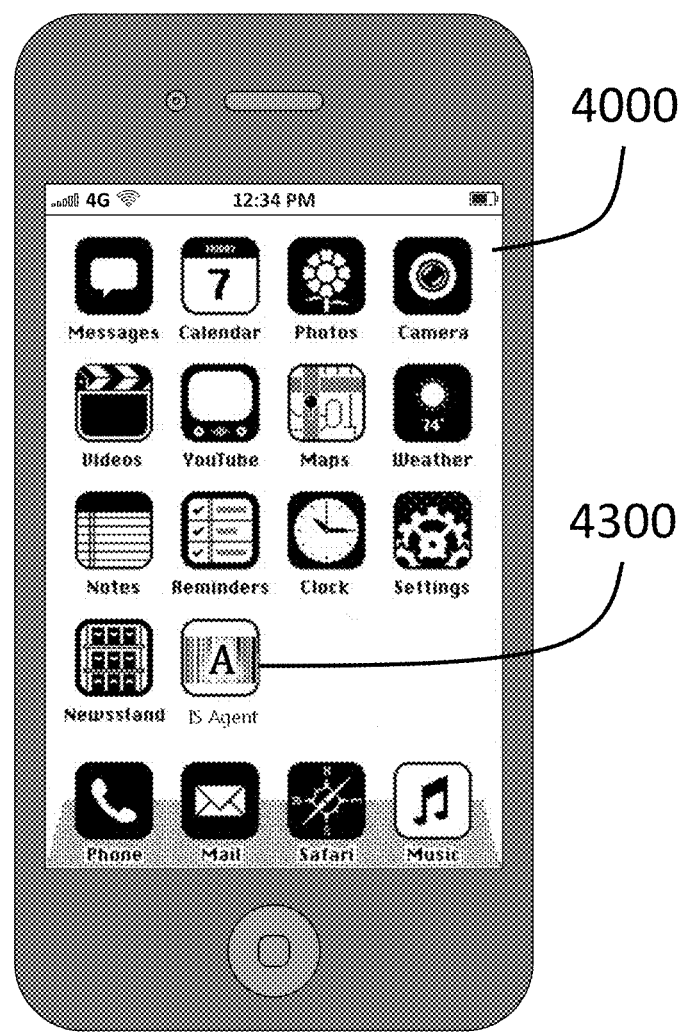

Referring now to FIGS. 9A-9C, various aspects of icon placement on the home screen 4000 of the mobile computing device 20 are described. In FIG. 9A, an exemplary illustration of a mobile operating system home screen 4000 providing access to the consumer-centric POS application 90 is shown. A POS application icon 4100 is associated with the first download of the POS application 90 from an app store, such as those provided by APPLE and GOOGLE. Selecting the POS application icon 4100 will cause the POS application to execute, allowing a new user 12 to apply to obtain insurance.

In FIG. 9B, an exemplary illustration of a home screen 4000 containing only the My Virtual ID icon 4200 is shown. According to the present invention, once a user 12 has acquired insurance via the system 10, they are provided with a virtual interactive insurance identification card 2000. The My Virtual ID icon 4200 provides immediate access to the virtual interactive insurance identification card 2000 from the home screen 4000 of the mobile computing device 20. The virtual interactive insurance identification card 2000 now becomes the primary interface for access to services which include the services originally available via the POS application 90 and the additional services provided once the user 12 has become an insured user. The original consumer-centric POS application icon 4100 is removed from the home screen in favor of the My Virtual ID icon 4200.

In FIG. 9C, an exemplary illustration of a home screen providing access to an agent-centric version of the POS application 90 is shown. The agent-centric icon 4300 is associated with the agent-centric POS application 90. Selecting the agent-centric icon 4300 will cause the agent-centric POS application 90 to execute to allow an agent to assist a consumer in obtaining insurance.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

What is claimed is:

1. A method for expediting provision of vehicular insurance quotes to a user via a mobile device to complete an application process, the method comprising:

collecting, via a mobile application installed on a mobile device, driver information and vehicular information associated with an applicant, without requiring manual input of data using a keyboard of the mobile device, wherein the driver information comprises information from a driver's license of the applicant comprising one or more of a name, an address, a gender, and a birth date of the applicant, wherein the vehicular information comprises a vehicle identification number (VIN) of a vehicle, and wherein the collecting comprises:

collecting the driver information by:

receiving a first image, captured using an imaging device of the mobile device, of a front side of the driver's license, processing the first image using a processor of the mobile device to extract first driver information from the first image using optical character recognition (OCR), receiving a first scan, captured using the imaging device of the mobile device, of a back side of the driver's license containing a barcode, extracting second driver information from the barcode in the first scan, and comparing the first driver information and the second driver information to verify the driver information; and collecting the vehicular information by:

receiving an image of the VIN of the vehicle captured using the imaging device of the mobile device and processing the image of the VIN using the processor of the mobile device to extract the VIN, or receiving a scan of a barcode of the VIN of the vehicle captured using the imaging device of the mobile device and extracting the VIN from the scan of the barcode;

verifying the collected driver and vehicular information against one or more databases comprising vehicle history and insurance information by comparing the collected driver information and the vehicular information with the vehicle history and insurance information of the one or more databases, wherein information in the one or more databases is not entered by the applicant using the mobile application;

sending the verified and collected driver and vehicular information to a quote generation engine configured to generate an insurance quote based on the verified and collected driver and vehicular information and additional information from the one or more databases comprising vehicle history and insurance information; and receiving the insurance quote from the quote generation engine and displaying the insurance quote to the applicant on a display of the mobile device.

2. The method of claim 1, wherein the vehicular information further comprises a garage address associated with the vehicle, and collecting the vehicular information comprises:

determining the garage address based on global positioning system (GPS) features of the mobile device; and verifying, using the GPS features of the mobile device that the applicant is located in proximity to the determined garage address.

3. The method of claim 2, further comprising further verifying the garage address by comparing the garage address with the vehicle history and insurance information of the one or more databases.

4. The method of claim 3, further comprising:

displaying the garage address to the applicant on the display of the mobile device; and receiving a user input on the mobile device indicative of confirmation of the garage address.

5. The method of claim 1, further comprising:

displaying the driver information to the applicant on the display of the mobile device; and receiving a user input on the mobile device indicative of confirmation of the driver information.

6. The method of claim 5, further comprising:

displaying the vehicular information to the applicant on the display of the mobile device; and receiving a user input on the mobile device indicative of confirmation of the vehicular information.

7. The method of claim 1, wherein the one or more databases comprising vehicle history and insurance information comprise one or more of the following:

a National Motor Vehicle Title Information System (NMVTIS) database;

a state Department of Motor Vehicle (DMV) database;

one or more databases comprising police, fire, and insurance records;

one or more databases from credit scoring entities;

one or more databases from vehicular data aggregators; and one or more databases from proprietary vehicular and driver data sources.

8. The method of claim 7, further comprising:

displaying, on the display of the mobile device, one or more underwriting questions to the applicant;

receiving user responses to the one or more underwriting questions, the user responses provided via the mobile device; and wherein the quote generation engine generates the quote in part based on the user responses.

9. The method of claim 8, wherein the user responses are provided without requiring manual entry via a keyboard of the mobile device.

10. The method of claim 9, wherein the user responses are provided via selection of one or more user selectable options.

11. The method of claim 1, further comprising:

collecting, via the mobile application installed on the mobile device, additional driver information for one or more additional drivers associated with the applicant; and wherein the quote generation engine generates the quote based on the additional driver information.

12. The method of claim 11, wherein collecting the additional driver information comprises:

receiving a third image, captured using an imaging device of the mobile device, of a front side of a driver's license of an additional driver, processing the third image using the processor of the mobile device to extract third driver information from the third image using OCR, receiving a third scan, captured using the imaging device of the mobile device, of a back side of the driver's license containing a barcode, extracting fourth driver information from the barcode in the third scan, and comparing the third driver information and the fourth driver information to verify the driver information.

13. The method of claim 11, wherein collecting the additional driver information comprises receiving the additional driver information from the one or more databases comprising vehicle history and insurance information.

14. The method of claim 1, wherein the vehicular information comprises information for a plurality of vehicles.

15. The method of claim 1, further comprising permitting manual entry of the driver information upon determination of a mismatch when comparing the first driver information and the second driver information to verify the driver information.

* * * * *